United States Patent
Baarman et al.

(10) Patent No.: US 9,209,627 B2
(45) Date of Patent: Dec. 8, 2015

(54) WIRELESS POWER SUPPLY SYSTEM AND MULTI-LAYER SHIM ASSEMBLY

(75) Inventors: David W. Baarman, Fennville, MI (US); William T. Stoner, Jr., Ada, MI (US); Benjamin C. Moes, Wyoming, MI (US); Joseph C. Van Den Brink, West Olive, MI (US); Joshua K. Schwannecke, Grand Rapids, MI (US); Neil W. Kuyvenhoven, Ada, MI (US)

(73) Assignee: ACCESS BUSINESS GROUP INTERNATIONAL LLC, Ada, MI (US)

( * ) Notice: Subject to any disclaimer, the term of this patent is extended or adjusted under 35 U.S.C. 154(b) by 0 days.

(21) Appl. No.: 13/217,565

(22) Filed: Aug. 25, 2011

(65) Prior Publication Data
US 2012/0049991 A1 Mar. 1, 2012

Related U.S. Application Data

(60) Provisional application No. 61/376,909, filed on Aug. 25, 2010.

(51) Int. Cl.
*H01F 27/28* (2006.01)
*H01F 5/00* (2006.01)
(Continued)

(52) U.S. Cl.
CPC ............ *H02J 5/005* (2013.01); *H01F 17/0013* (2013.01); *H01F 27/022* (2013.01); *H01F 27/04* (2013.01); *H01F 38/14* (2013.01);
(Continued)

(58) Field of Classification Search
CPC ... H01F 17/0013; H01F 27/022; H01F 27/04; H01F 38/14; H02J 5/005; H02J 7/025; H02J 17/00; Y10T 29/4902

USPC ......... 336/200, 223, 232, 192, 205, 206, 170, 336/190, 195; 320/108, 150, 166, 180; 343/788, 787
See application file for complete search history.

(56) References Cited

U.S. PATENT DOCUMENTS 2,584,592 A * 2/1952 Kehbel .............................. 334/6
7,176,776 B1 * 2/2007 Tantwai et al. ............... 336/200
(Continued)

FOREIGN PATENT DOCUMENTS

| EP | 2 211 438 | 7/2010 |
|----|-----------|--------|
| GB | 2389720 | 12/2003 |

(Continued)

OTHER PUBLICATIONS

International Search Report and Written Opinion of the International Searching Authority, International Application No. PCT;/US2011/049065, dated Dec. 8, 2011.
(Continued)

*Primary Examiner* — Mangtin Lian
(74) *Attorney, Agent, or Firm* — Warner Norcross & Judd LLP

(57) ABSTRACT

A wireless power supply includes a multi-layer shim assembly. Each shim aids in alignment of coils and routing of conductors in a multi-layer coil array. A shield or PCB can be used as part of the multi-layer shim assembly. Wires can be routed through channels to the edge of the shim assembly or wires can protrude through a portion of the multi-layer shim assembly. Traces can be used to route current through the multi-layer shim assembly. Plastic shims can be created by over-molding coils with plastic.

21 Claims, 23 Drawing Sheets

(51) Int. Cl.
*H02J 5/00* (2006.01)
*H01F 17/00* (2006.01)
*H01F 27/02* (2006.01)
*H01F 27/04* (2006.01)
*H01F 38/14* (2006.01)
*H02J 7/02* (2006.01)
*H02J 17/00* (2006.01)

(52) U.S. Cl.
CPC ................ *H02J 7/025* (2013.01); *H02J 17/00* (2013.01); *Y10T 29/4902* (2015.01)

(56) References Cited

U.S. PATENT DOCUMENTS

| 7,952,322 | B2* | 5/2011 | Partovi et al. | 320/108 |
| 2008/0111518 | A1* | 5/2008 | Toya | 320/108 |
| 2008/0164840 | A1* | 7/2008 | Kato et al. | 320/108 |
| 2008/0197960 | A1* | 8/2008 | Hasegawa et al. | 336/110 |
| 2010/0181842 | A1 | 7/2010 | Suzuki et al. | |

FOREIGN PATENT DOCUMENTS

| WO | 2007090168 | 8/2007 |
| WO | 2008032746 | 3/2008 |

OTHER PUBLICATIONS

Photographs of disassembled Energizer Inductive Charging Station, UPN-127987, purchased on Oct. 21, 2010.

\* cited by examiner

WIRELESS POWER SUPPLY SYSTEM AND MULTI-LAYER SHIM ASSEMBLY

BACKGROUND OF THE INVENTION

The present invention relates to wireless power supplies and methods for constructing wireless power supplies.

Wireless power solutions are becoming more common. A simple wireless power solution can include a wireless power supply and a remote device, such as a mobile telephone. The wireless power supply can have a wall plug, wireless power circuitry, and a primary coil. Power is supplied from a wall outlet, the circuitry uses the power to energize the primary coil producing an electromagnetic field. The remote device includes a secondary coil, wireless power circuitry, and a load. When the remote device is placed in proximity of the electromagnetic field generated by the primary coil, the secondary coil receives the energy. The circuitry in the remote device uses the power from the secondary coil to energize the load, thereby transferring power from the wireless power supply to the remote device without the use of electrical contacts between the wireless power supply and the remote device.

Some more complicated wireless power solutions have also been developed. For example, some wireless power supplies include multiple primary coils configured in an array where a remote device can be placed on the array to receive the wireless power. Some arrays provide all the primary coils adjacent to each other in a single layer. Other arrays are multiple layers and have primary coils that overlap. By utilizing an array of primary coils, the power transfer surface can be larger than a single coil wireless power supply. In some circumstances an array is used to transfer more power than a single primary coil could provide. In other circumstances the array may be used to provide positional freedom to the remote device. In yet other circumstances, the array may provide the capability to charge multiple remote devices.

Various problems can arise in constructing a primary coil array. First, because each primary coil has at least two leads for connection to the wireless power supply circuitry, managing the connections can be difficult because of the number of connections to be routed. It can be time consuming to make the individual connections between each coil and the wireless power circuitry. Second, securing each of the primary coils in position can be tedious and time-consuming. The placement of the primaries relative to each other can affect the electromagnetic field that is generated, and therefore the efficiency of the power transfer. Poor alignment during manufacture can result in efficiency losses throughout the entire lifetime of the wireless power supply. Third, given the number of connections to be routed in an array, some of the connections are sometimes routed over some of the other coils in the array in order to reach the wireless power circuitry. Too many wires crossing over the coils can have a negative impact on the thickness of the stack and the electromagnetic field generated by the array.

One attempted solution for addressing some of the difficulty in constructing a primary array is to construct the array using a printed circuit board. Primaries can be constructed in a printed circuit board using conductor trace patterns. A multi-layer printed circuit board can be utilized to produce a multi-layer array. Although printed circuit board arrays can overcome some of the challenges associated with constructing a primary array, they can be inefficient, especially at higher power output levels. Heat can also be an issue that is difficult to address in a printed circuit board array.

It can be more difficult to align and connect wire primary coils in a wire primary array than in a printed circuit board primary array, however efficiency and heat issues are less of an issue in a wire primary array than in printed circuit board array solutions. Some rudimentary solutions for primary wire coil arrays have been attempted, but they are not satisfactory for high volume production situations and are limited to small arrays.

SUMMARY OF THE INVENTION

The aforementioned problems are overcome by an embodiment of the present invention wherein a wireless power supply includes a multi-layer shim assembly. Each shim in the assembly aids in alignment of coils and routing of conductors in a multi-layer coil array. Portions of each shim can provide a pattern suitable for alignment and routing. A housing, shield, and wireless power circuitry may be included in the wireless power supply with the multi-layer shim assembly and multi-layer coil array.

In one embodiment, each shim layer is made from non-conductive material and includes guides for aligning coils in an array and channels for routing wires to an edge of the shim assembly. To construct the multi-layer coil array, the shims can be mounted to the shield one at a time on top of each other, the coils in each layer can be aligned and fixed in position using the guides, and the wires in each layer can be routed using the wire routing channels before stacking the next shim. Wireless power circuitry can be mounted to the other side of the shield on a printed circuit board or positioned elsewhere within the wireless power supply. Wires protruding from the edge of the multi-layer shim assembly can wrap around the outside of the shield and connect to the printed circuit board or otherwise connect to the wireless power circuitry. In one embodiment, the wires can all be routed to the same edge of the shim assembly. In alternative embodiments, the wires can be routed to multiple edges of the shim assembly.

In an alternative embodiment, the shield can replace a shim opposite the power transfer surface, one example is a bottom shim in a multi-layer shim assembly. That is, the shield may include guides for aligning coils and channels for routing wires. By utilizing the shield as part of the multi-layer shim assembly, the thickness of the wireless power supply can be reduced.

In one embodiment, instead of wires being routed through channels to the edge of the shim assembly, the wires protrude through a portion of the multi-layer shim assembly and connect to the wireless power circuitry. In embodiments where the wireless power supply circuitry is on a printed circuit board secured to the shield, the wires from the shim assembly can protrude through holes in the printed circuit board and be soldered or otherwise connected to the printed circuit board.

In one embodiment, one or more of the shims are printed circuit boards and have traces for routing current. The coils can be connected to the traces and routed to the wireless power circuitry. The shim circuit boards may have via connections allowing the layered shims to be soldered together and to pass current between them. The shim circuit boards may include a pin connector for connecting the multi-layer shim assembly to the wireless power circuitry. In embodiments where the wireless power circuitry is included in the multi-layer shim assembly, the traces can connect directly to the wireless power circuitry.

In one embodiment, stamped electrical traces are over-molded to form plastic shims. The plastic shims include guides for aligning coils and embedded electrical traces for routing current through the shims. The termination points on the stamped metal traces for connecting to the wireless power circuitry and the coils in the multi-layer coil array can be crimp connections, solder pads, or other suitable termination structures.

In one embodiment, plastic shims are created by over-molding a layer of coils with plastic. Electrical connector leads can protrude out of the plastic covering for connection with wireless power circuitry. Multiple plastic shims can be placed on top of one another to form a multi-layer coil array shim assembly. Some of the plastic shims may include apertures so that electrical connectors from other plastic shims can pass through. The coil leads protrude from the outer diameter and inner diameter of each coil and connect to an electrical connector lead. One advantage of this configuration is that the coil lead on the inside diameter of the coil does not cross-over the coil. In a variation on this embodiment, each coil in the shim may be individually over-molded. Each layer of individually over-molded coils constitutes a shim.

It is desirable to provide a construction aid for aligning coils in an array where the performance of the wireless power solution is dependent on the geometric pattern of center to center spacing of the array. The multi-layer shim array assembly eases manufacturing by assisting in aligning coils, assisting in routing wires, and connecting the coil array to wireless power circuitry.

These and other objects, advantages, and features of the invention will be more fully understood and appreciated by reference to the description of the current embodiment and the drawings.

Figure 1:
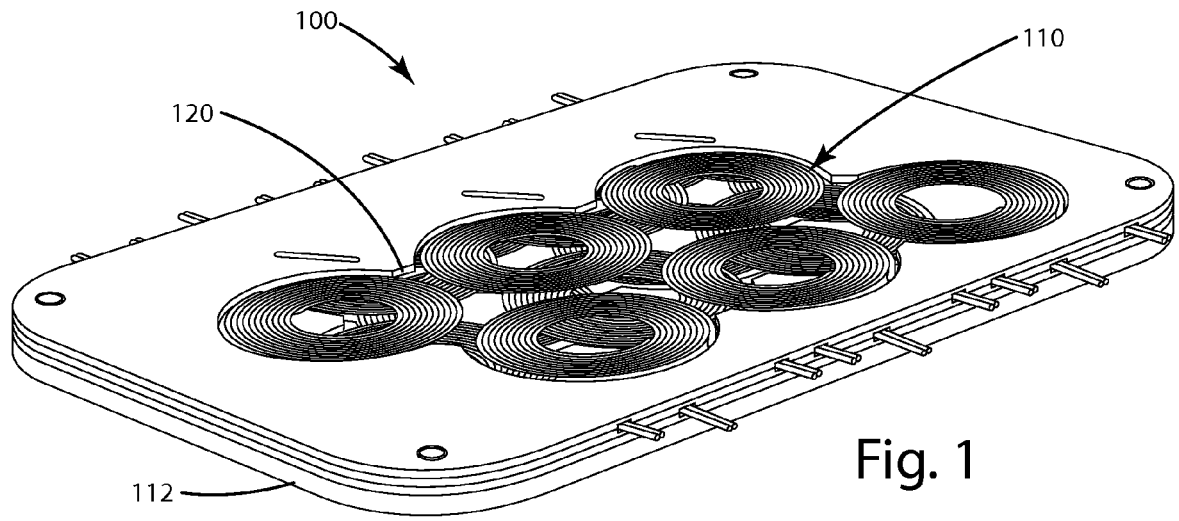
FIG. 1 shows a perspective view of an assembled multi-layer shim assembly with leads routed to two edges.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Figure 2:
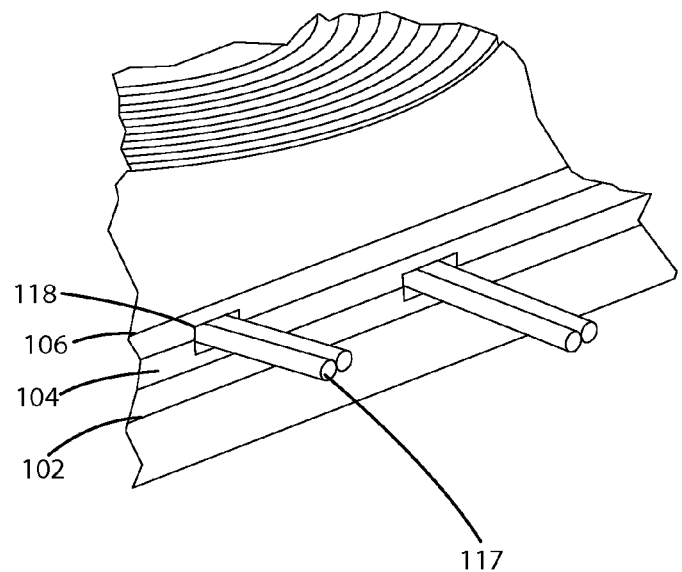
FIG. 2 shows a detailed view of a portion of the multi-layer shim assembly of FIG. 1.
Figure 3:
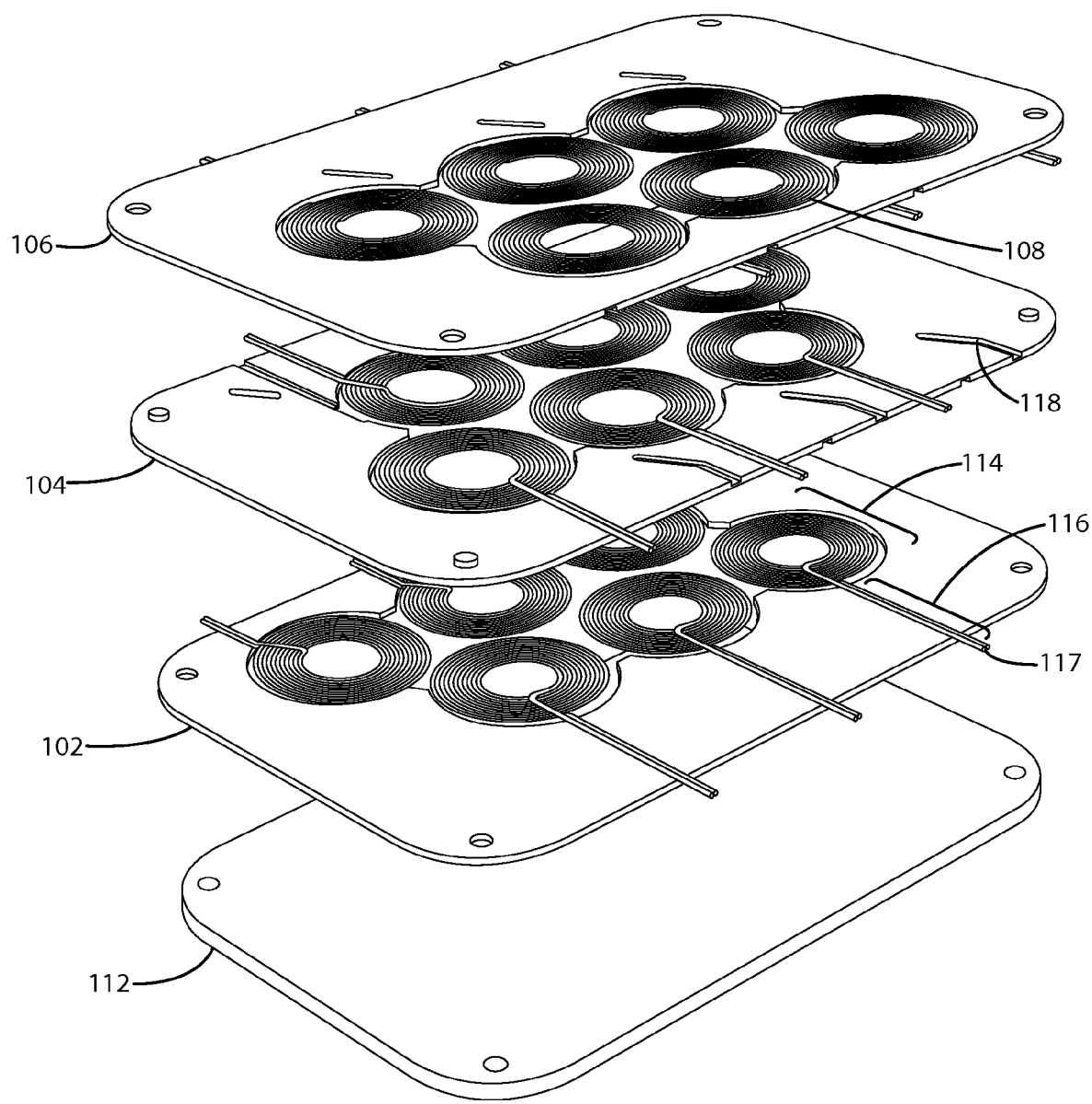
FIG. 3 shows an exploded view of the multi-layer shim assembly of FIG. 1.

A multi-layer shim assembly constructed in accordance with one embodiment of the present invention is shown in FIGS. 1-3, and generally designated 100. In general, the multi-layer shim assembly includes multiple shims and multiple coils. Each shim aids in aligning some of the coils into a coil array, and collectively the shims together arrange the coils into a multi-layer coil array. The shims also aid in routing electricity between wireless power supply circuitry and the coils.

Referring to FIGS. 1-3, the depicted embodiment of the multi-layer shim assembly 100 includes three shims 102, 104, 106, eighteen coils 108 forming a multi-layer coil array 110, and a shield 112. Each shim aligns six coils into a single layer coil array and the three shims collectively align the eighteen coils into a three layer coil array.

Each coil 108 has a winding portion 114 and a transmission portion 116. The winding portion 114 includes one or more turns, such that when energized with alternating current, an electromagnetic field is generated. The transmission portion 116 refers to the portion of the coil that provides a connection to the alternating current source and includes the two or more leads 117 for connecting the coil. Sometimes the transmission portion 116 is referred to as the coil wires. Although the coils shown in the current embodiment are flat and spiral wound, in other embodiments, different types and shapes of coils may be implemented. For example, flat rectangular wound coils could be used instead of spiral wound coils.

In the current embodiment, each shim layer is made from non-conductive material and includes guides 120 for aligning coils in an array and a routing portion 118 for routing electrical connections from the coils.

The guides 120 are portions of each shim suitable for aligning the coils into an array at a designated location. As depicted, the guides 120 can be portions of the shim that are removed providing an aperture with walls defining a position for each coil. When the shim is secured to a surface, coils can be placed in the apertures and the walls of the apertures can be used to ensure the coils are positioned properly. As shown in FIG. 3, as shims are placed on top of one another, coils can rest on the top surface of a shim below or on the top surface of a coil below. As depicted, the coils of each layer are generally flush with the top and bottom surface of the respective shim in which they are placed. In that way, coils that rest on the top of a shim surface are generally in vertical alignment with coils that rest on the top of a coil surface. In other embodiments, the guides 120 can be an embossed pattern that assists with alignment. That is, instead of apertures in the shims, each shim can have a pattern for aligning the coils in that shim. In this type of embodiment, the coils from each layer do not rest on the shim beneath. The size and shape of the coils can vary depending on the embodiment. For example, coils can be manufactured thin so that when they are placed on the embossed pattern they are flush with or below the top surface of the shim. The guides 120 can be molded during manufacture or milled after molding. In yet another embodiment, the guides 120 can be connection points where the coils can be electrically connected.

The routing portion 118 assists in routing the transmission portion 116 of the coils 108 from the winding portion 114 of the coils 108 to the wireless power circuitry. For example, each shim may include routing channels 118 large enough to route the transmission portion 116 of each of the coils 108 in the coil array associated with that shim. In other embodiments, such as the embodiment shown in FIGS. 1-3, two shims may cooperate to form a larger routing channel when placed next to each other. In some embodiments, some or all of the routing channels 118 can be large enough to route the transmission portion 116 of multiple coils simultaneously.

Figure 4:
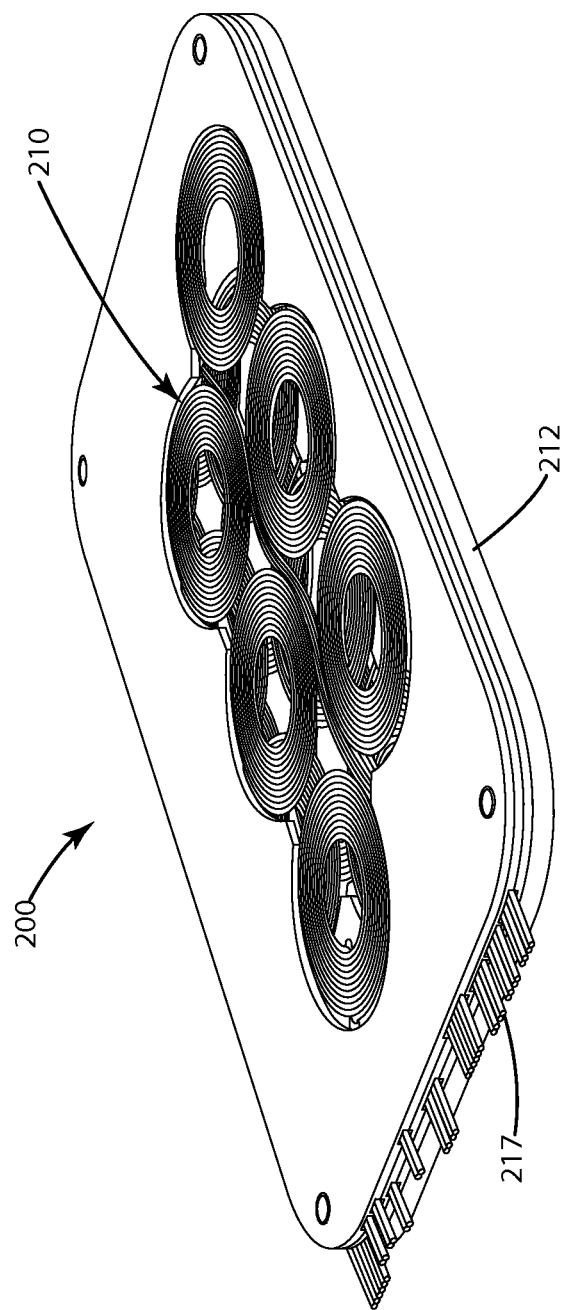
FIG. 4 shows a perspective view of an assembled multi-layer shim assembly with leads routed to one edge.
Figure 5:
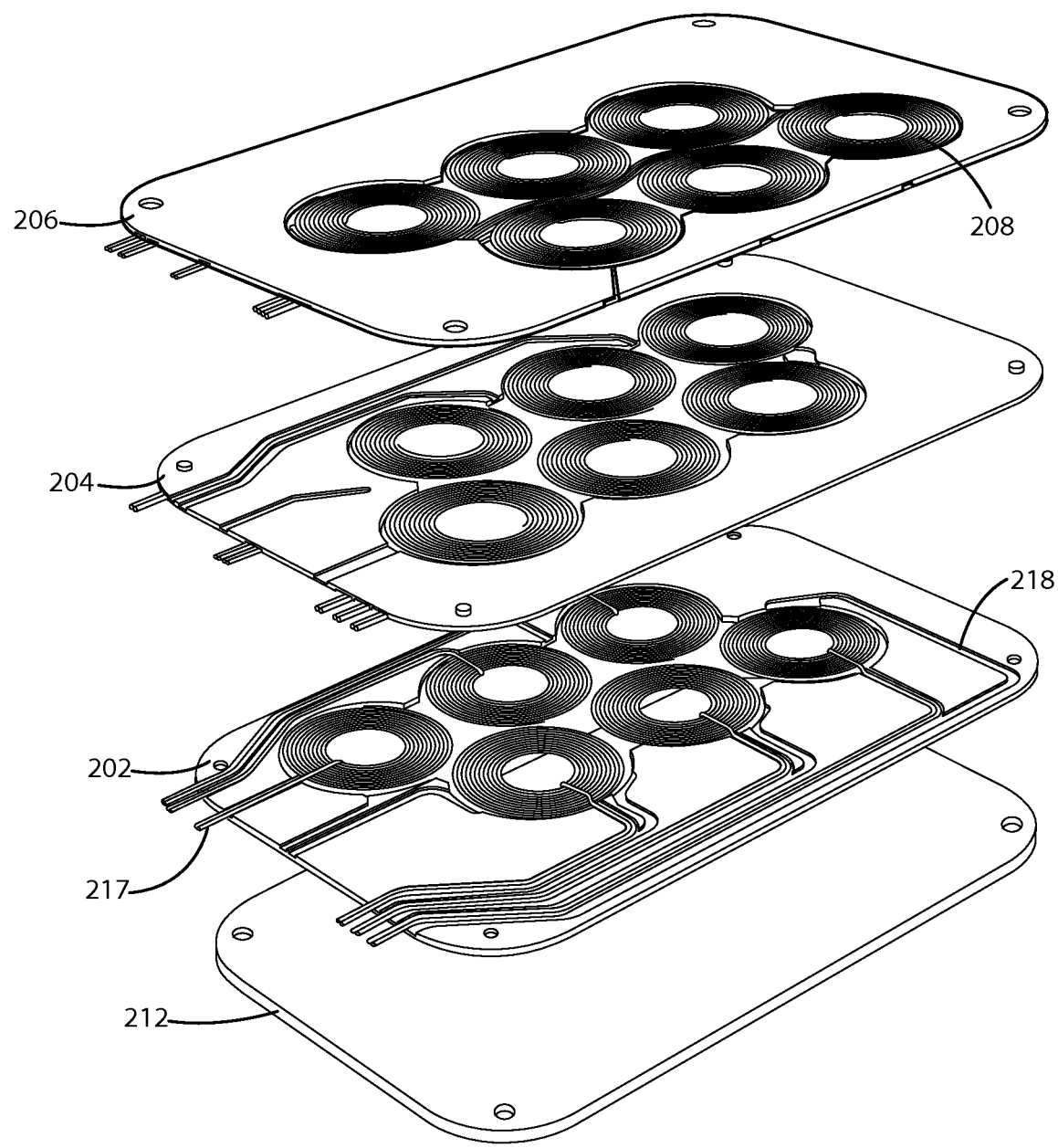
FIG. 5 shows an exploded view of a portion of the multi-layer shim assembly of FIG. 4.

In general, to construct the multi-layer shim assembly, the shims can be mounted to each other or, in embodiments that have a shield, to the shield one at a time on top of each other. After placing the first shim 102, the winding portion of each coil for that layer can be aligned in position using the guides 120 and fixed in place. The transmission portion 116 of each coil for that layer can be routed using the wire routing channels 118 before stacking the next shim. Wireless power circuitry can be mounted to the other side of the shield on a printed circuit board or positioned elsewhere. Wires protruding from the edge of the multi-layer shim assembly can wrap around the outside of the shield and connect to the printed circuit board or otherwise connect to the wireless power circuitry, for example by solder connection of terminal blocks. In one embodiment, as shown in FIGS. 1-3, the wires can be routed to multiple edges of the shim assembly. In another embodiment, as shown in FIGS. 4-5 the wires can all be routed to the same edge of the shim assembly.

One specific method of construction of the multi-layer shim assembly of FIGS. 1-3 includes 1) attaching a first shim to the shield with an adhesive, such as glue or double sided tape, or essentially any other suitable fastener, 2) aligning and affixing six coils in the cutouts of the first shim such that the coil wires are aligned to protrude through the wire routing channels near each coil, 3) affixing the second shim above the first shim and first six coils, 4) aligning and affixing the second layer of six coils with the second shim, 5) routing the wires of the second layer of coils through the channels in the second shim, 6) placing the third layer of six coils, 7) routing the wires of the third layer of coils through the channels in the second shim, 8) aligning and affixing the third shim above the second shim and second layer of coils, 9) aligning and affixing the third layer of six coils with the third shim.

Figure 26:
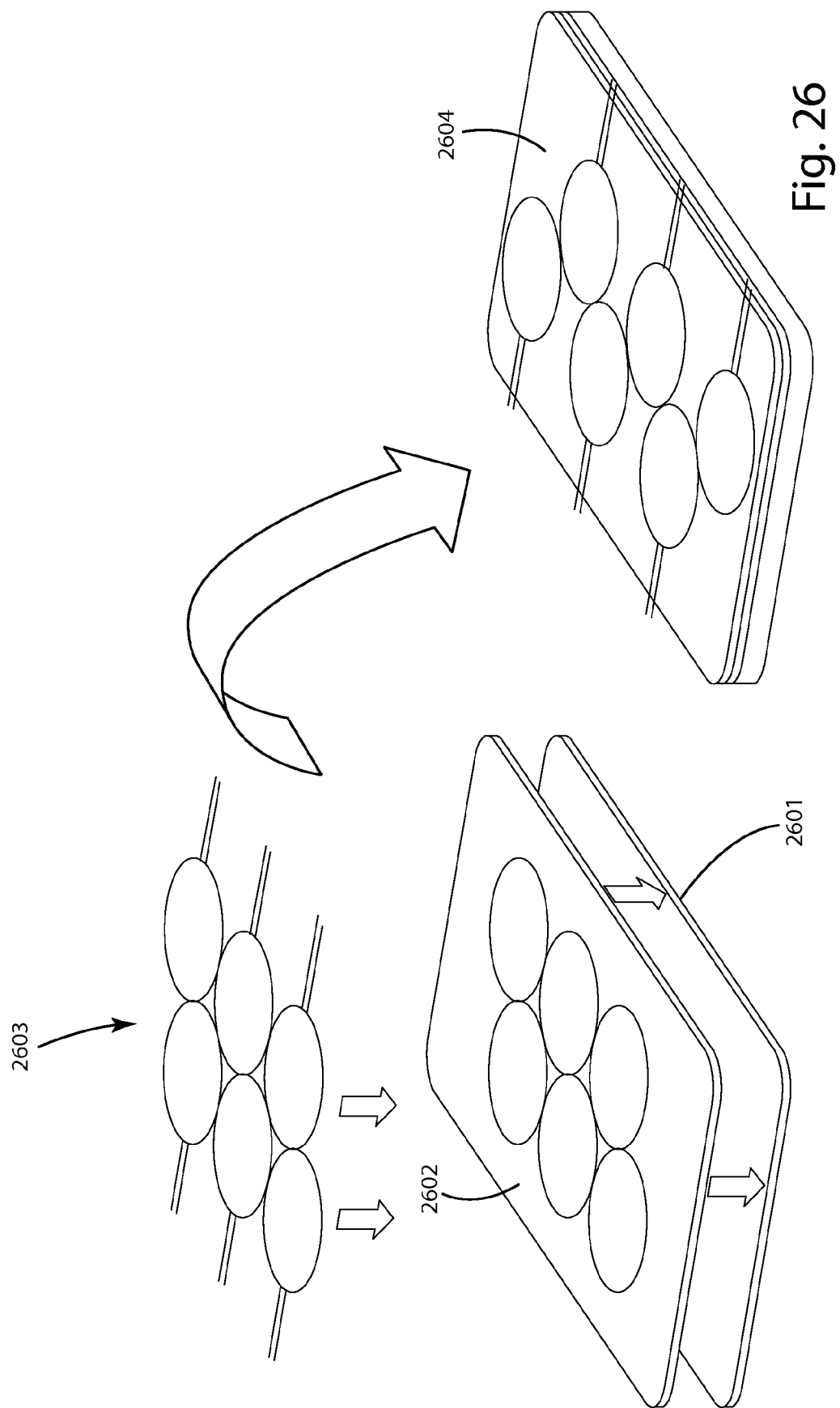
FIG. 26 shows a representative flow diagram of some of the steps for one embodiment of manufacturing a multi-layer shim assembly.

FIG. 26 illustrates a general flow diagram for a set of alternative steps replacing steps 6-9 discussed above in connection with a method of construction of a multi-layer shim assembly of FIGS. 1-3. In this embodiment, a top shim assembly 2601, 2602, 2603 is assembled and joined with the bottom shim assembly 2604. The bottom shim assembly 2604 can be assembled as described in connection with steps 1-5 discussed above or using another suitable assembly method. In one embodiment, the top shim assembly may be assembled and joined with the bottom shim assembly to create a multi-layer shim assembly, as follows. First, single sided adhesive film 2601 can be laid down, with adhesive side up. The top shim 2602 can be placed upside down on the adhesive film 2601. The coils 2603 can be laid down in the top shim 2602. The wires can be routed through the channels in the top shim 2602. Next, an optional step is to apply an adhesive to the top shim assembly 2601, 2602, 2602 or to the bottom shim assembly 2604. Next, the top shim assembly 2601, 2602, 2603 can be flipped over and aligned with the bottom shim assembly 2604 to create a multi-layer shim assembly.

Figure 27:
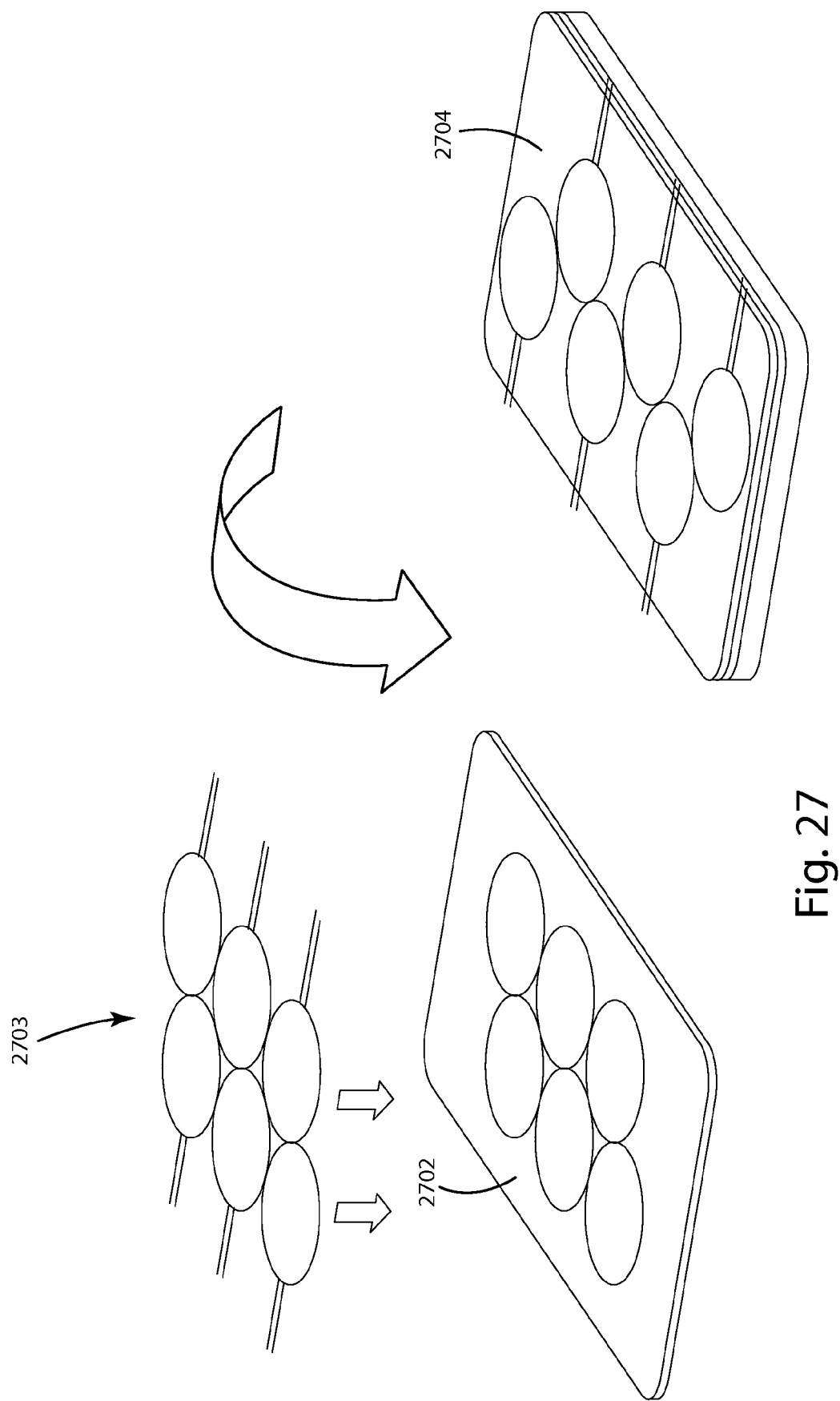
FIG. 27 shows a representative flow diagram of some of the steps for one embodiment of manufacturing a multi-layer shim assembly.

FIG. 27 illustrates a general flow diagram for another set of alternative steps replacing steps 6-9 discussed above in connection with a method of construction of a multi-layer shim assembly of FIGS. 1-3. In this embodiment, a top shim assembly 2702, 2703 is assembled and joined with the bottom shim assembly 2704. The bottom shim assembly 2704 can be assembled as described in connection with steps 1-5 discussed above or using another suitable assembly method. In one embodiment, the top shim assembly may be assembled and joined with the bottom shim assembly to create a multi-layer shim assembly, as follows. First, the top shim 2702 is placed upside down on a flat surface. The coils 2703 are laid down in the top shim 2702. The wires are routed through the channels in the top shim 2702. Next, an optional step is to apply an adhesive to the top shim assembly 2702, 2703 or to the bottom shim assembly 2704. Next, the partial shim assembly 2704 can be flipped over and aligned with the top shim assembly 2702, 2703 to create a multi-layer shim assembly.

Once assembled, the multi-layer shim assembly can be mounted to a housing of a wireless power supply. The housing may have specific features to align and affix the multi-layer shim assembly to the housing. The entire assembly can be hidden within, behind or underneath the housing. The depicted embodiment minimizes the overall thickness of the wireless power supply because each layer of coils is flush with the top surface and the bottom surface of its respective shim. Further, this construction minimizes the gap between the primary coil array and the remote device.

The depicted embodiment of the multi-layer shim assembly provides a high level of effectiveness of the shield because the first layer of coils is in physical contact with the shield 112. The shield can be essentially any suitable shield, such as a ferrite magnetic flux shield 112. In some embodiments, the shield can be a flux concentrator, for example a flux concentrator as described in U.S. patent application Ser. No. 12/868,052, entitled Flux Concentrator and Method of Making a Magnetic Flux Concentrator, filed on Aug. 25, 2010, which is herein incorporated by reference.

Referring to FIGS. 4-5, an embodiment of a multi-layer shim assembly 200 is depicted that is similar to the multi-layer shim assembly shown in FIGS. 1-3. The multi-layer shim assembly 200 includes three shims 202, 204, 206, eighteen coils 208 forming a multi-layer coil array 210, and a shield 212. The main difference is that the coil leads 217 of each of the coils are all routed to the same edge of the shim assembly. FIG. 5 illustrates one way the wire routing channels can be formed in the shims to accomplish the routing to one edge of the multi-layer shim assembly. The shield 212, coils 208, and shims 202, 204, 206 can be assembled generally as described in connection with the FIGS. 1-3 embodiment. The assembled multi-layer shim assembly 200 can be mounted in or on the housing of a wireless power supply. Wireless power circuitry may be included on a printed circuit board mounted below the shield and the coil leads 217 can wrap around to connect to the circuitry. In alternative embodiments, the wireless power circuitry may be included elsewhere in the wireless power supply.

Figure 6:
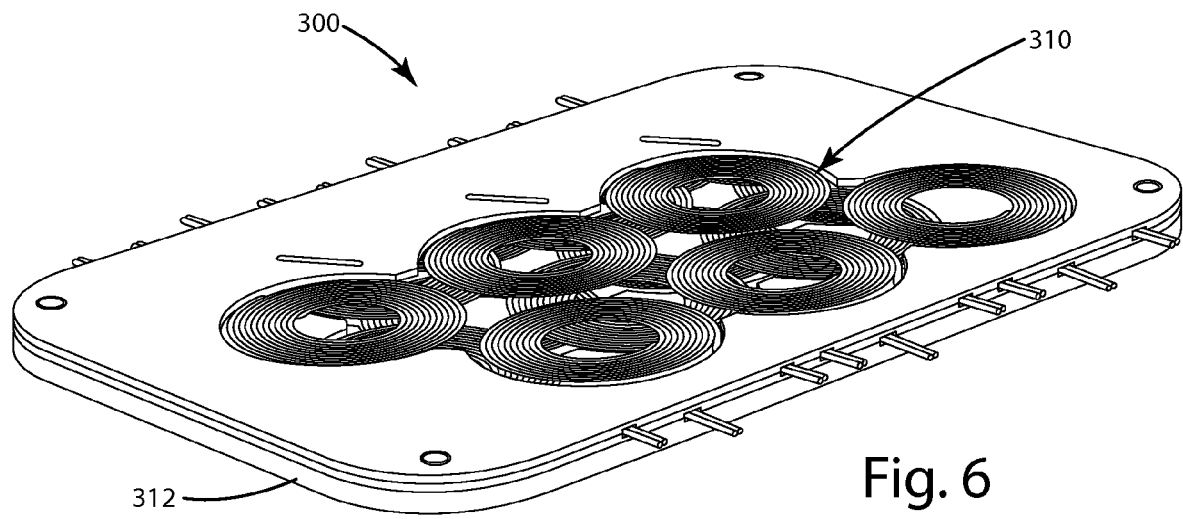
FIG. 6 shows a perspective view of an assembled multi-layer shim assembly with a shield shim.
Figure 7:
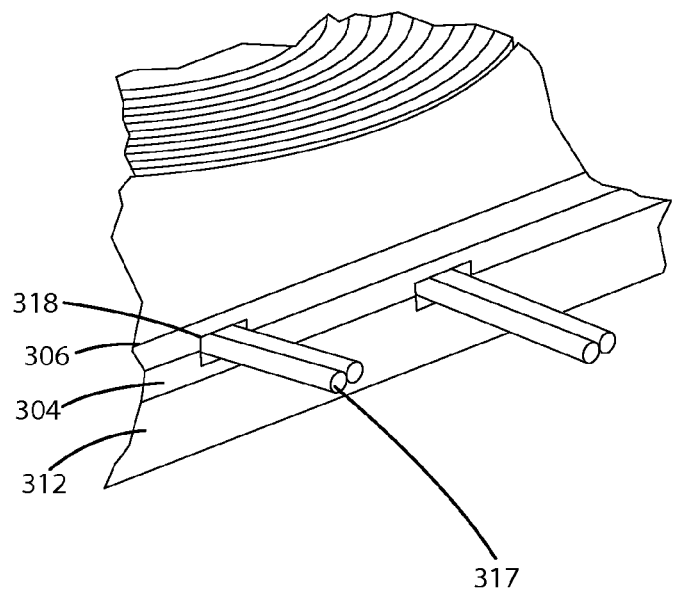
FIG. 7 shows a detailed view of a portion of the multi-layer shim assembly of FIG. 6.
Figure 8:
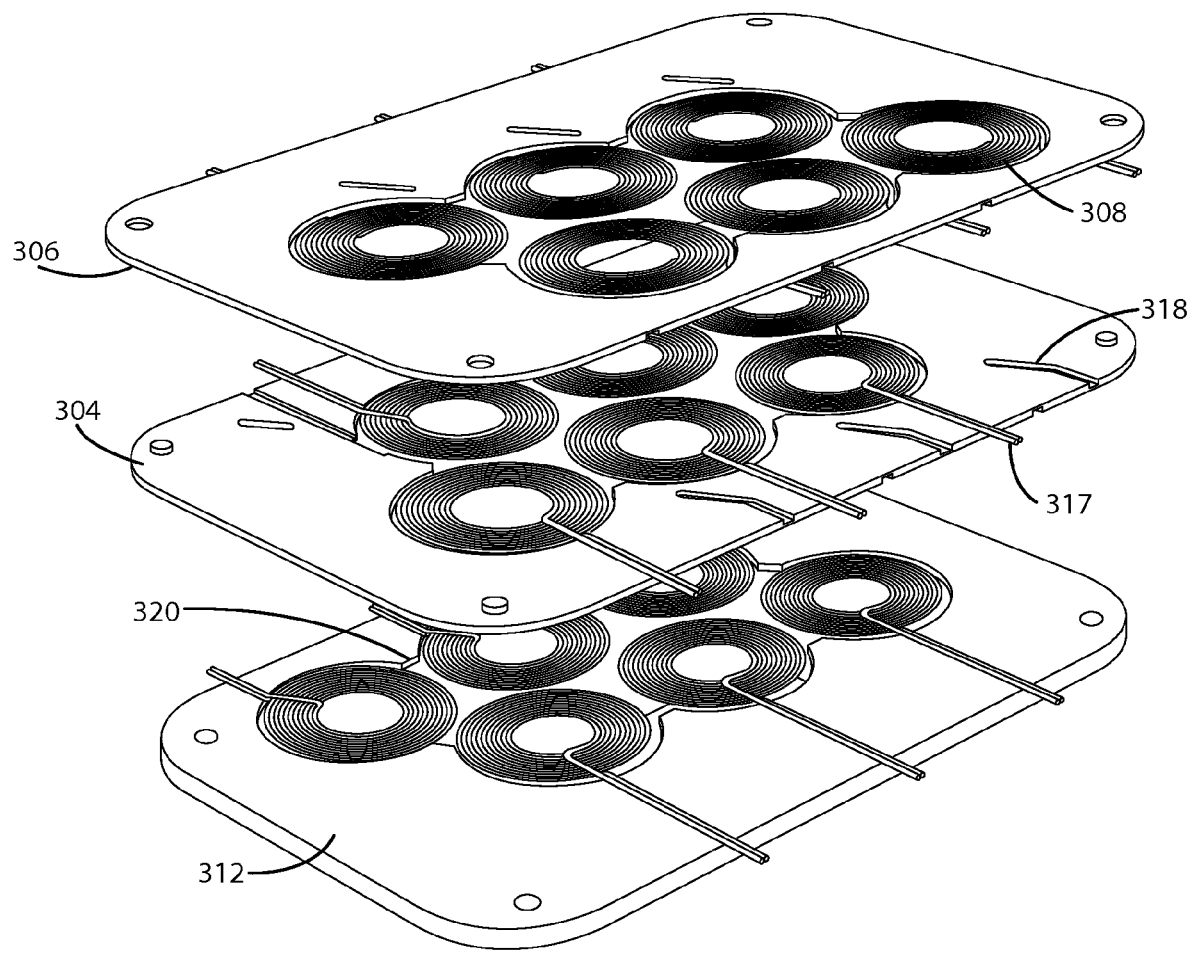
FIG. 8 shows an exploded view of the multi-layer shim assembly of FIG. 6.

Referring to FIGS. 6-8, an embodiment of a multi-layer shim assembly 300 is depicted that is somewhat similar to the multi-layer shim assembly shown in FIGS. 1-3. The multi-layer shim assembly 300 includes two shims 304, 306, eighteen coils 308 forming a multi-layer coil array 310, and a shield shim 312. The main difference between this embodiment and the embodiment depicted in FIGS. 1-3 is that the shield shim 312 replaces one of the shims for aligning the coils and routing the wires.

The shield shim 312 includes guides 320 for aligning coils in an array and channels 318 for routing wires to an edge of the shim assembly. The guides 320 in the shield are portions of the shield suitable for aligning the coils into an array at a designated location. As depicted, the guides 320 can be an embossed pattern that assists with alignment. That is, the shield shim 312 can have an embossed pattern for aligning the coils on the shield. The size and shape of the embossed pattern can vary depending on the size and shape of the coils. The guides 320 in the shield shim 312 can be molded during manufacture or milled after molding. As shown in FIG. 8, coils can be positioned in an array using guides 320 and 304 can be secured on top of the shield shim 312 such that when coils are positioned in shim 304 they either rest on the top surface of shield shim 312 or on the top surface of the coils 308 positioned in the shield shim 312. The coils of each layer can be generally flush with the top and bottom surface of the respective shim in which they are placed. In that way, coils that rest on the top of a shim surface are generally in vertical alignment with coils that rest on the top of a coil surface. In an alternative embodiment, the guides 320 can be portions of the shield that are removed to provide an aperture with walls defining a position for each coil. When the shim is secured to a surface, such as another layer of shielding, coils can be placed in the apertures and the walls of the apertures can be used to ensure the coils are positioned properly.

In alternative embodiments, the shims 304, 306 may include shielded portions and unshielded portions. For example, the unshielded shim portions may be positioned to overlap the coils in the multi-layer coil array and an area surrounding the multi-layer coil array and the shielded portions of each shim 304, 306 may cover any portion of the shim that is not overlapping a coil in the multi-layer coil array. In this way, a multi-layer shim assembly may be provided that includes a wireless transfer path uninterrupted by shielding, but substantially all other paths other than the wireless transfer path can be prohibited by shielding.

Figure 9:
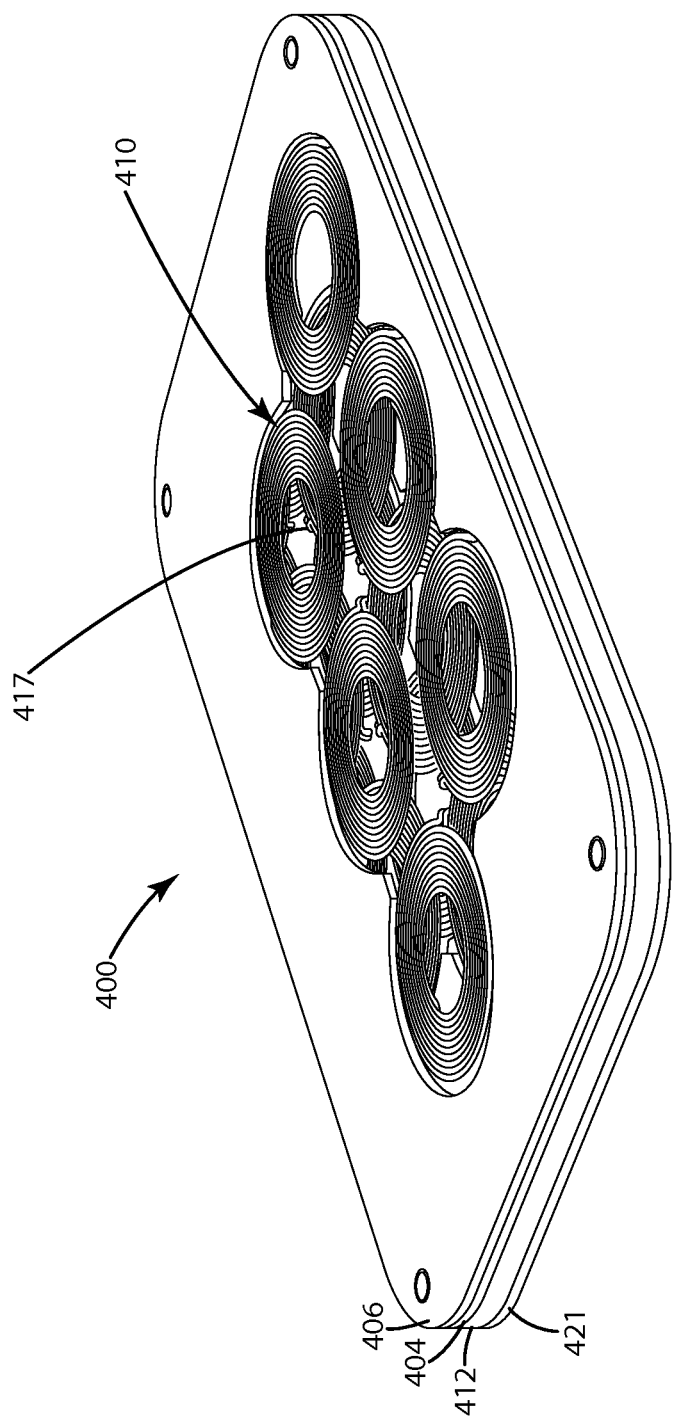
FIG. 9 shows a perspective top view of an assembled multi-layer shim assembly with wires protruding through the assembly.
Figure 10:
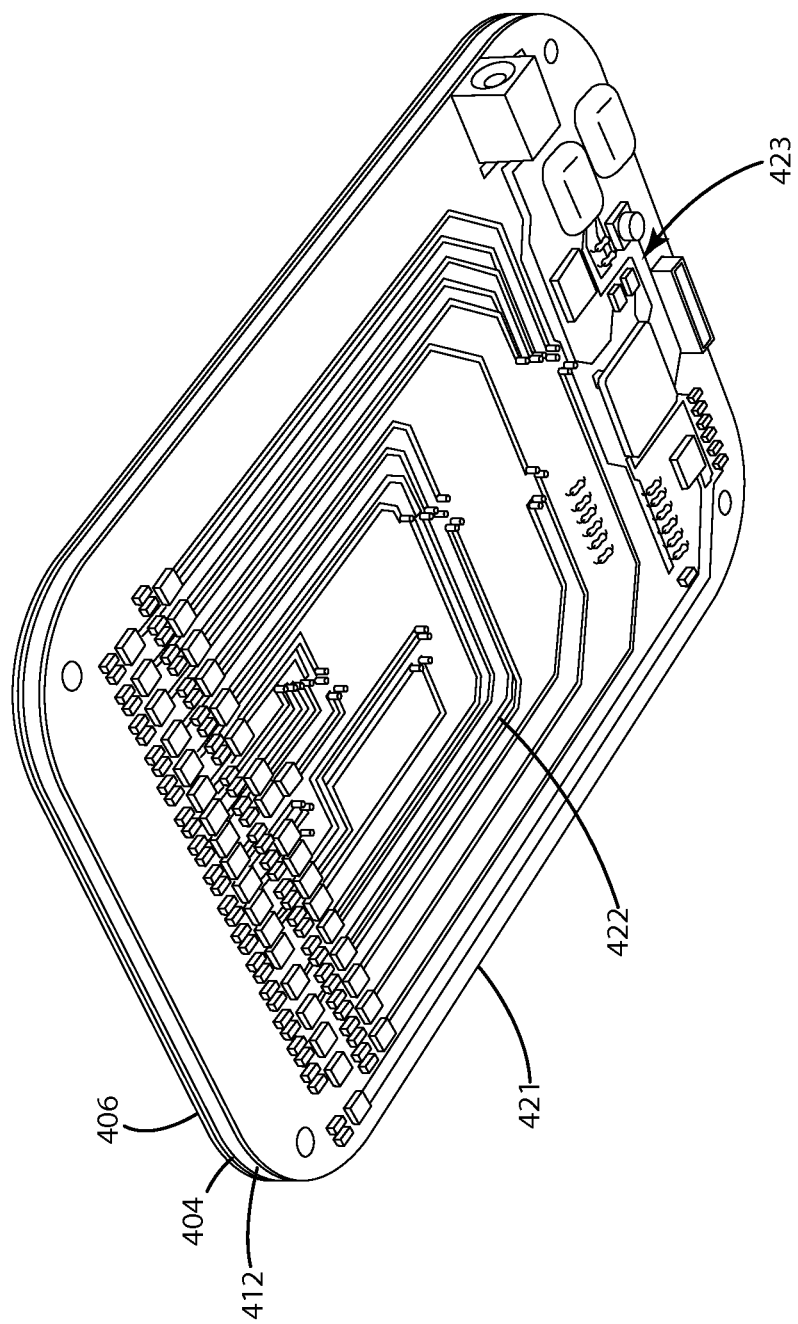
FIG. 10 shows a perspective bottom view of the multi-layer shim assembly of FIG. 9.
Figure 11:
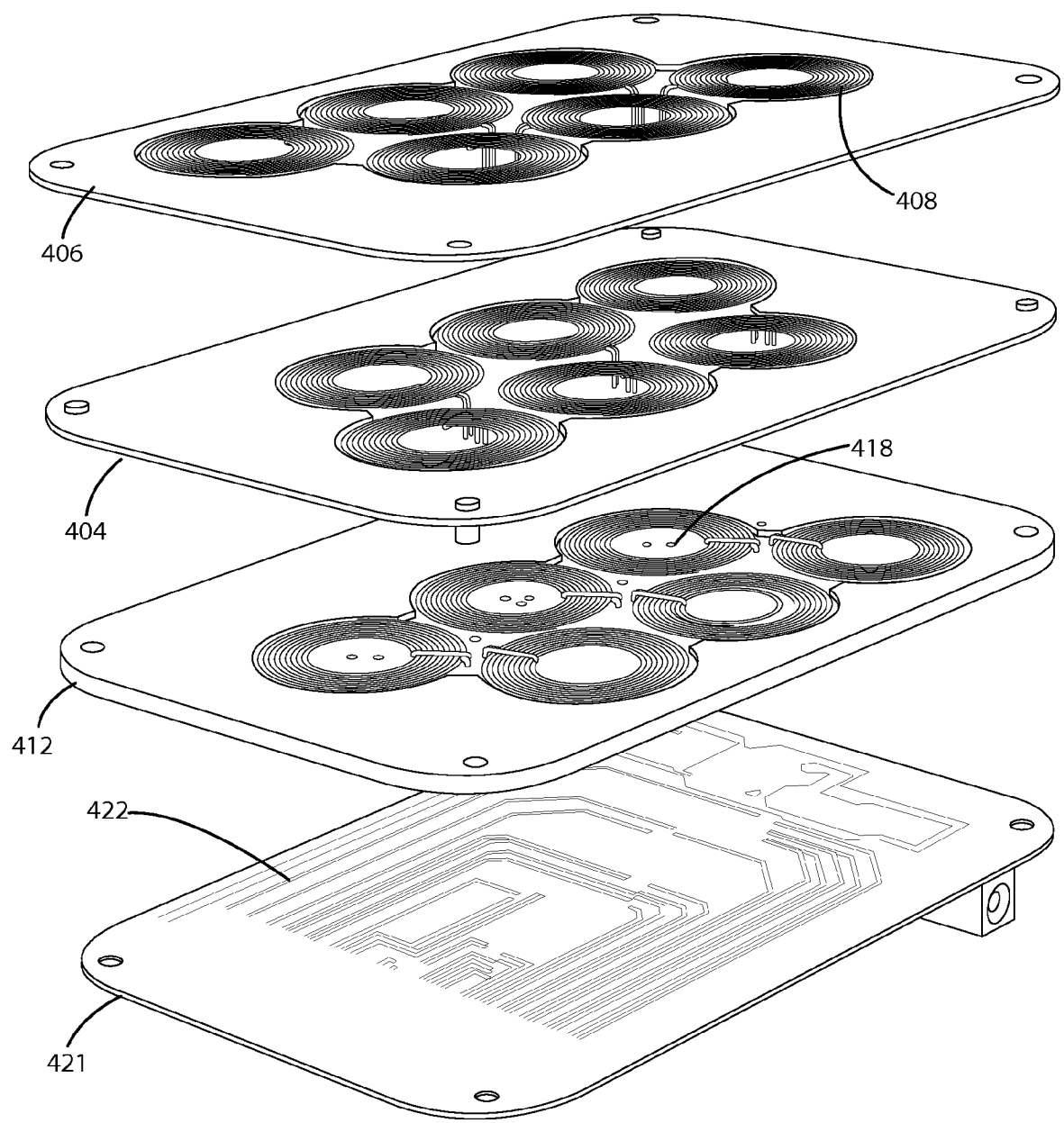
FIG. 11 shows an exploded view of the multi-layer shim assembly of FIG. 9.
Figure 12:
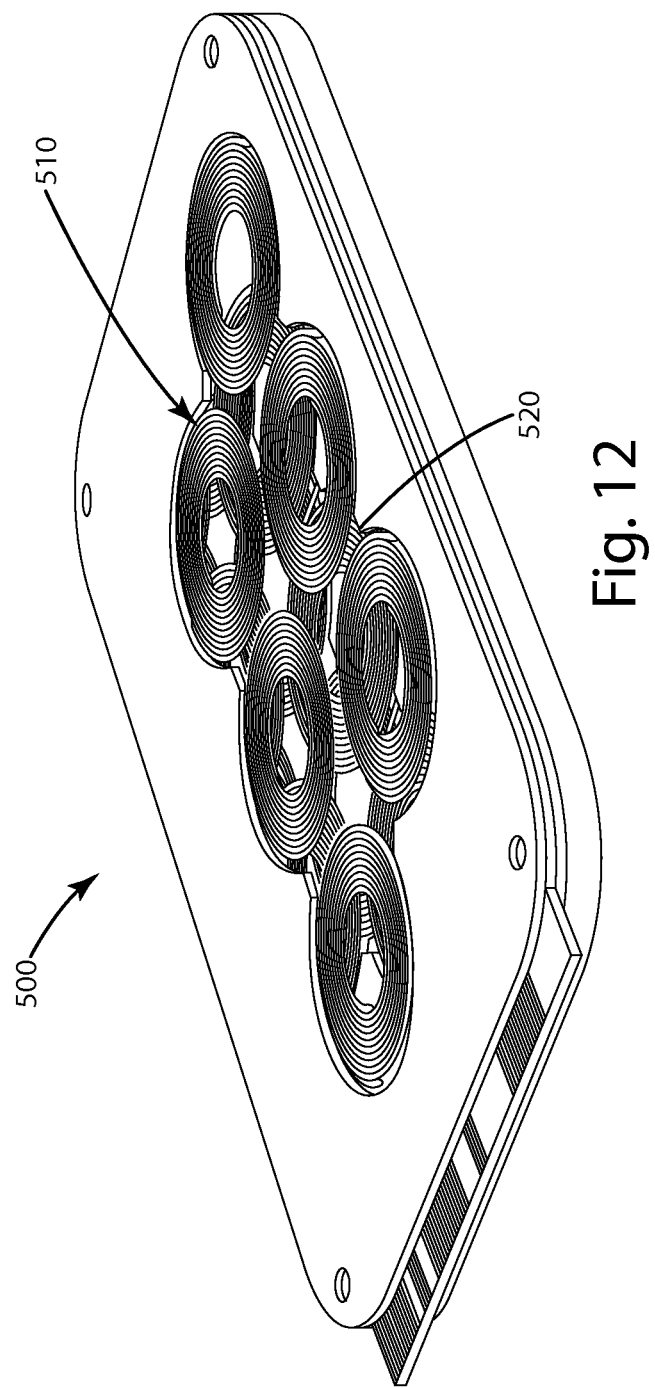
FIG. 12 shows a perspective view of an assembled multi-layer shim assembly with printed circuit board shims.

Referring to FIGS. 9-11, an embodiment of a multi-layer shim assembly 400 is depicted that is somewhat similar to the multi-layer shim assembly shown in FIGS. 6-8. The multi-layer shim assembly 400 includes two shims 404, 406, eighteen coils 408 forming a multi-layer coil array 410, a shield shim 412, and a printed circuit board 421. The main difference between this embodiment and the embodiment depicted in FIGS. 6-8 is that the wire routing channels 418 are vertical instead of horizontal.

The shims 404, 406 and the shield shim 412 are stacked as described in connection with the FIGS. 6-8 embodiment, however, instead of the coil wires being routed through channels to the edge of the assembly, the wires protrude through a portion of the multi-layer shim assembly and connect to the wireless power circuitry 423. In embodiments where the wireless power supply circuitry 423 is located on a printed circuit board 421 secured to the shield 412, the coil wires can protrude through holes in the printed circuit board and be soldered or otherwise connected to the conductive traces 422 on the printed circuit board 421. The conductive traces 422 on the printed circuit board 421 can route electrical connections to wireless power circuitry located 423 on the printed circuit board 421 or to a terminal area such as a edge board connector, solder pads, screw terminals, or other appropriate termination.

Referring to FIGS. 12-16, an embodiment of a multi-layer shim assembly 500 is depicted that is somewhat similar to the multi-layer shim assembly shown in FIGS. 4-5. The multi-layer shim assembly 500 includes three printed circuit board shims 502, 504, 506, eighteen coils 508 forming a multi-layer coil array 510, and a shield 512. The main difference between this embodiment and the embodiment depicted in FIGS. 4-5 is that the shims are made of printed circuit board.

The printed circuit board shims 502, 504, 506 are constructed of dual layer printed circuit boards and have traces 518 instead of wire routing channels. In the current embodiment, each printed circuit board shim 502, 504, 506 includes guides 520 for aligning coils in an array and traces 518 for routing electricity to an edge of the shim assembly. The coil wires 517 of each coil are connected to the traces 518 of each shim 502, 504, 506 by soldering to a connection area 519 near to the outside diameter of each coil. In this manner, the length of the coil wires can be kept to a manageable, short length. The two sided circuit boards can have via connections allowing the layered shims to be soldered together and to pass current between them.

Figure 13:
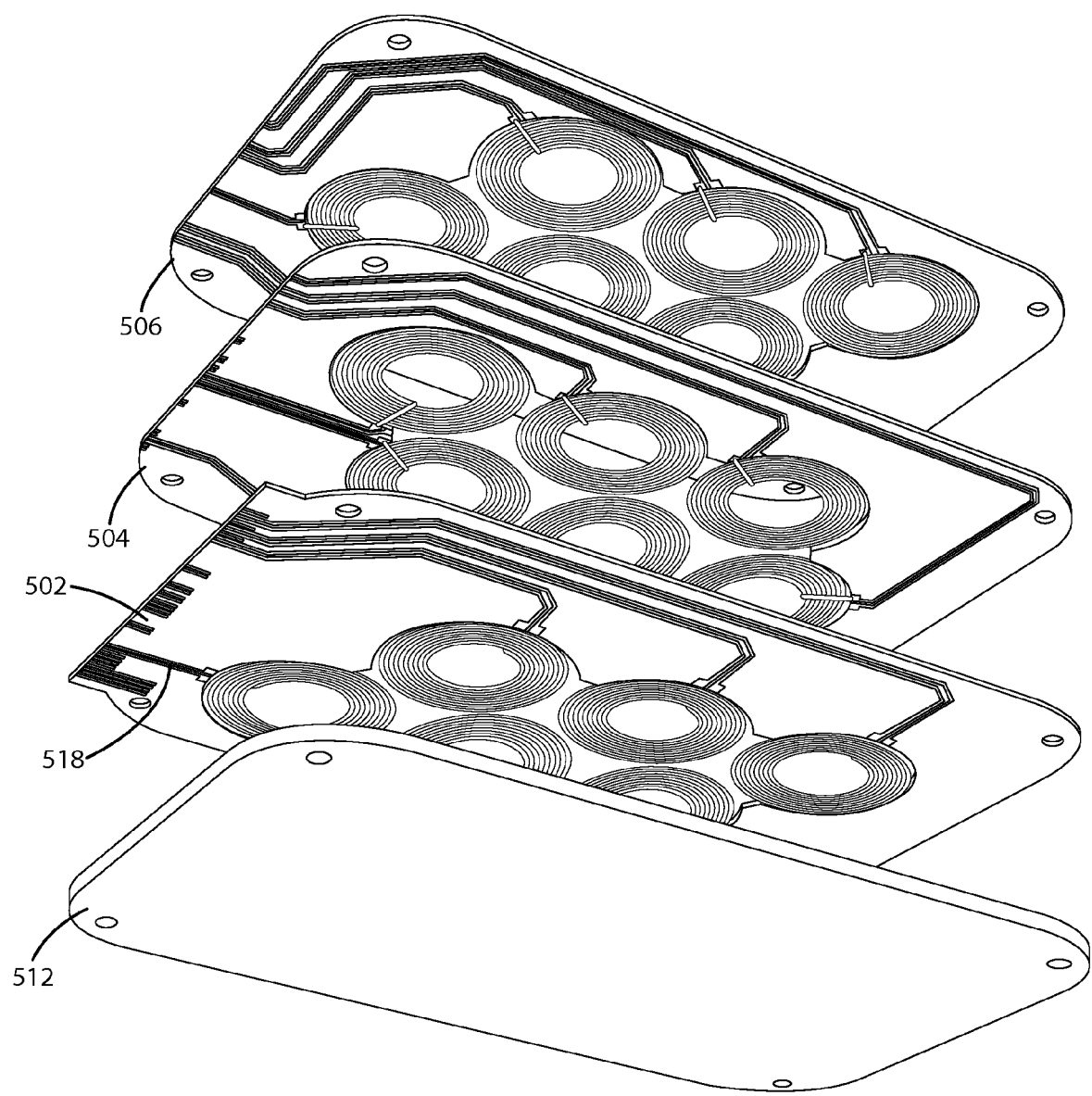
FIG. 13 shows an exploded bottom view of the multi-layer shim assembly of FIG. 12.
Figure 14:
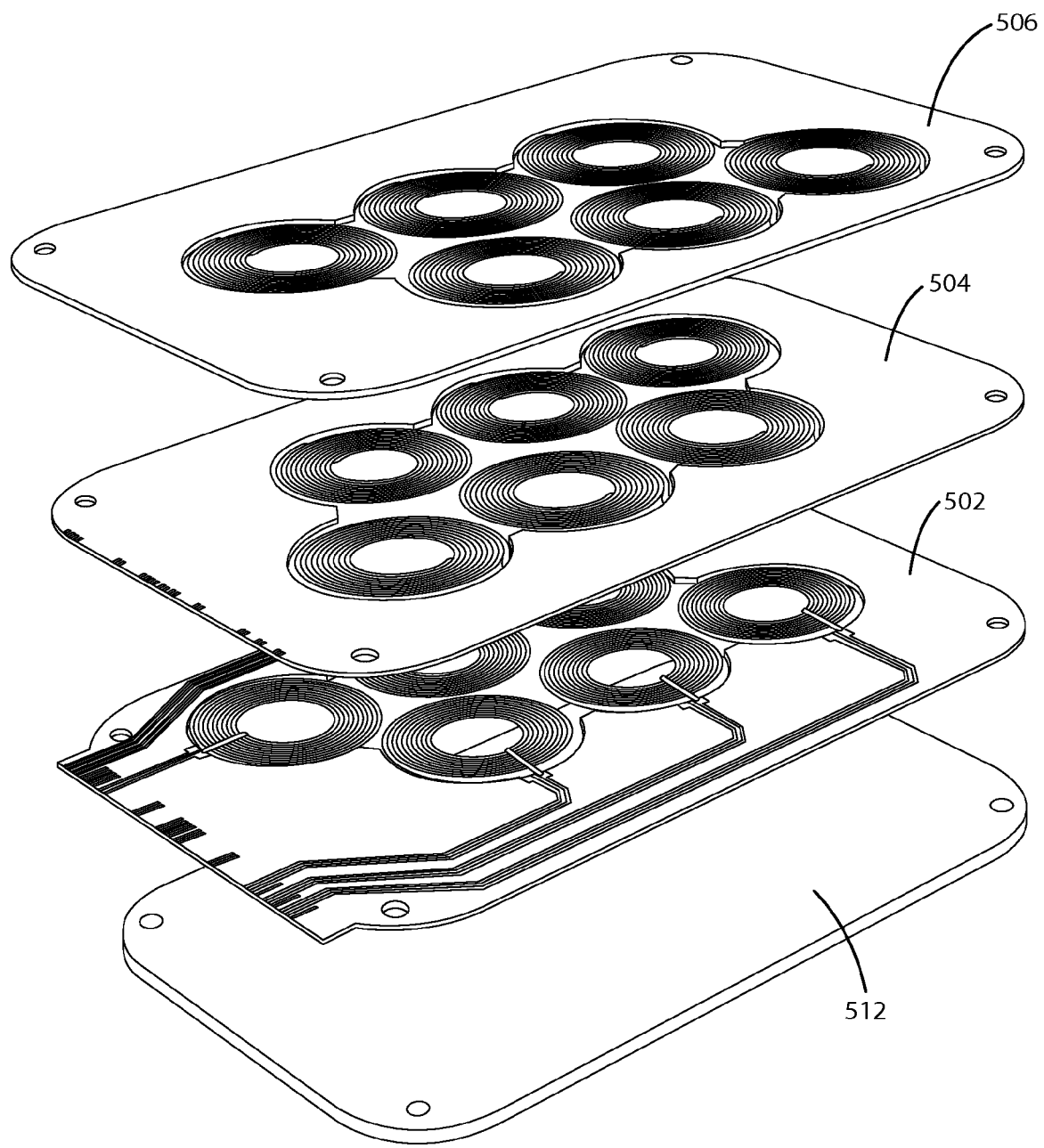
FIG. 14 shows an exploded top view of the multi-layer shim assembly of FIG. 12.
Figure 15:
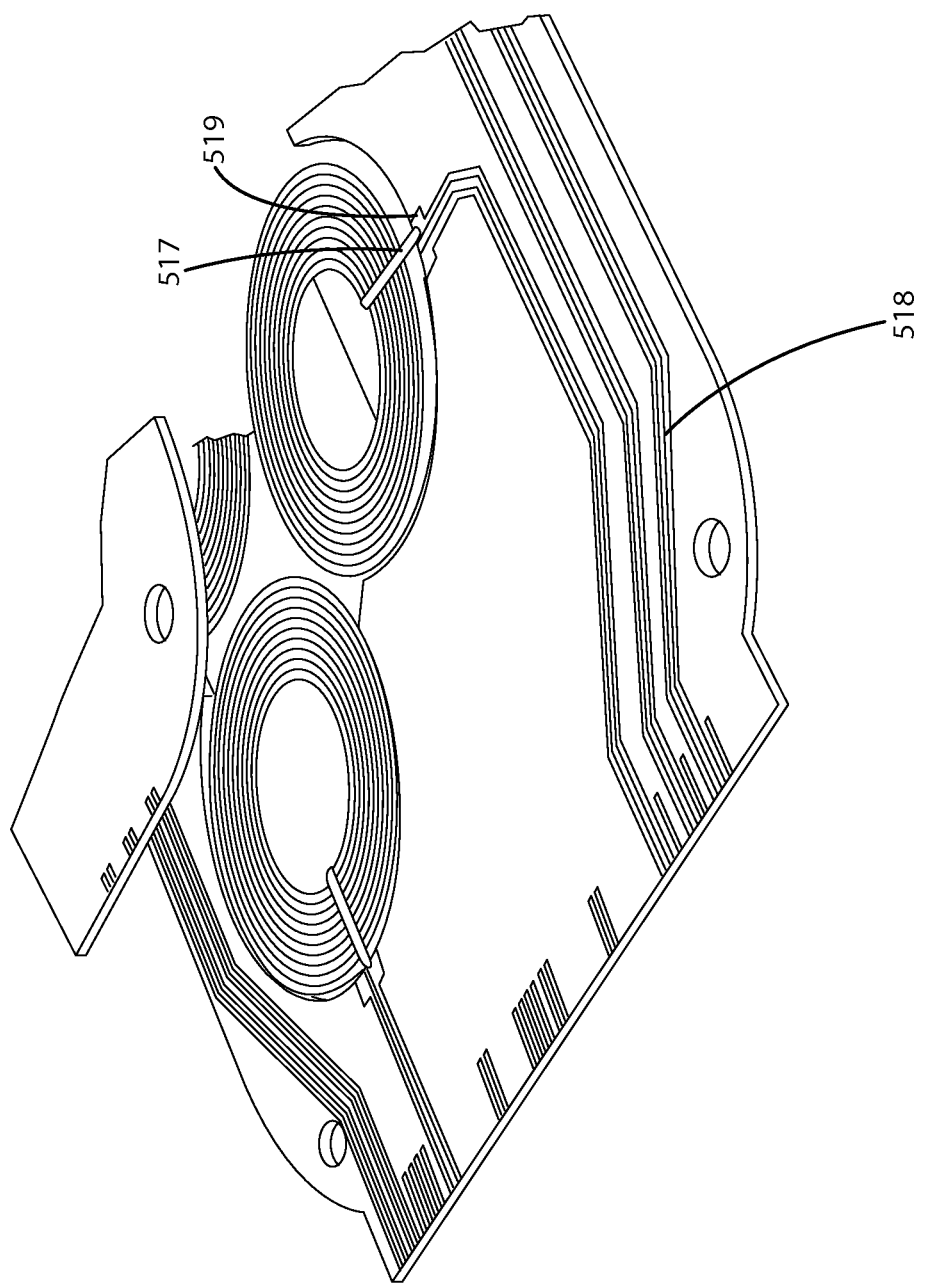
FIG. 15 shows a detailed view of a portion of the multi-layer shim assembly of FIG. 12.
Figure 16:
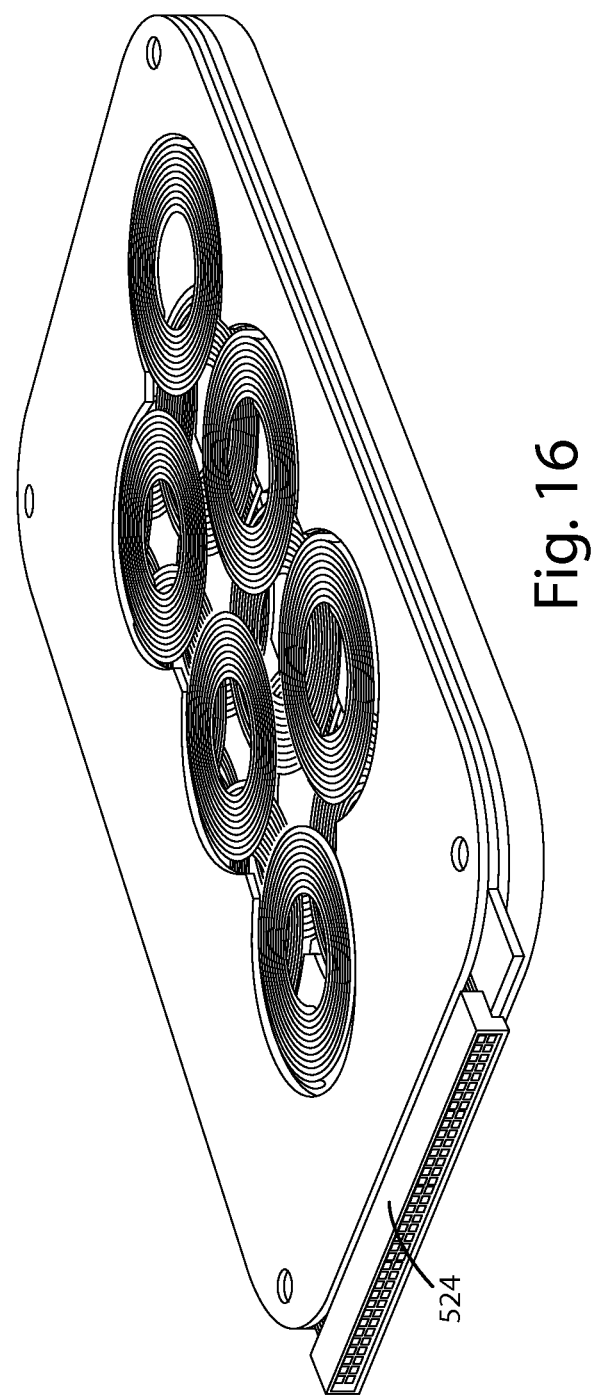
FIG. 16 shows a perspective view of the multi-layer shim assembly of FIG. 12 with a pin connector.
Figure 17:
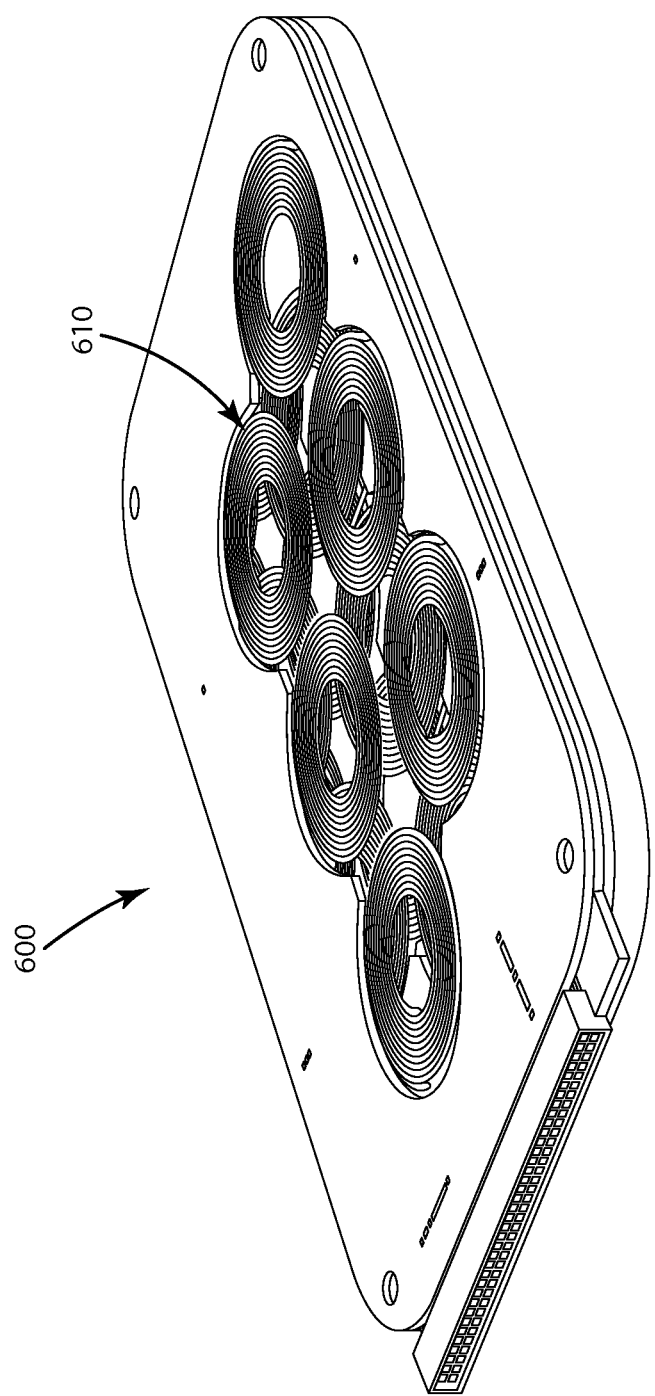
FIG. 17 shows a perspective view of an assembled multi-layer shim assembly with plastic over-molded shims with embedded traces.

Perhaps as best shown in FIG. 13, one of the printed circuit board shims 502 can extend further than the other shims 504, 506 and shield 512 to allow for electrical connection. The edge of the extended printed circuit board shim 502 can have solder pads, pin connectors, terminal blocks, or essentially any other termination structure. For example, as shown in FIG. 16, the multi-layer shim assembly 500 may include a pin connector 524. The pin connector provides an interface for electrically connecting wireless power circuitry to the multi-layer shim assembly 500. The connection to the printed circuit board shim may be made with discrete wires, a ribbon cable, or essentially any other suitable connector.

Referring to FIGS. 17-20, an embodiment of a multi-layer shim assembly 600 is depicted that is somewhat similar to the multi-layer shim assembly shown in FIGS. 12-16. The multi-layer shim assembly 600 includes three shims 602, 604, 606, eighteen coils 608 forming a multi-layer coil array 610, and a shield 612. The main difference between the multi-layer shim assembly of FIGS. 12-16 and this embodiment is that the shims in this embodiment are not printed circuit board shims with traces, but rather are plastic shims that are co-molded around stamped electrical traces to form circuit paths.

Figure 18:
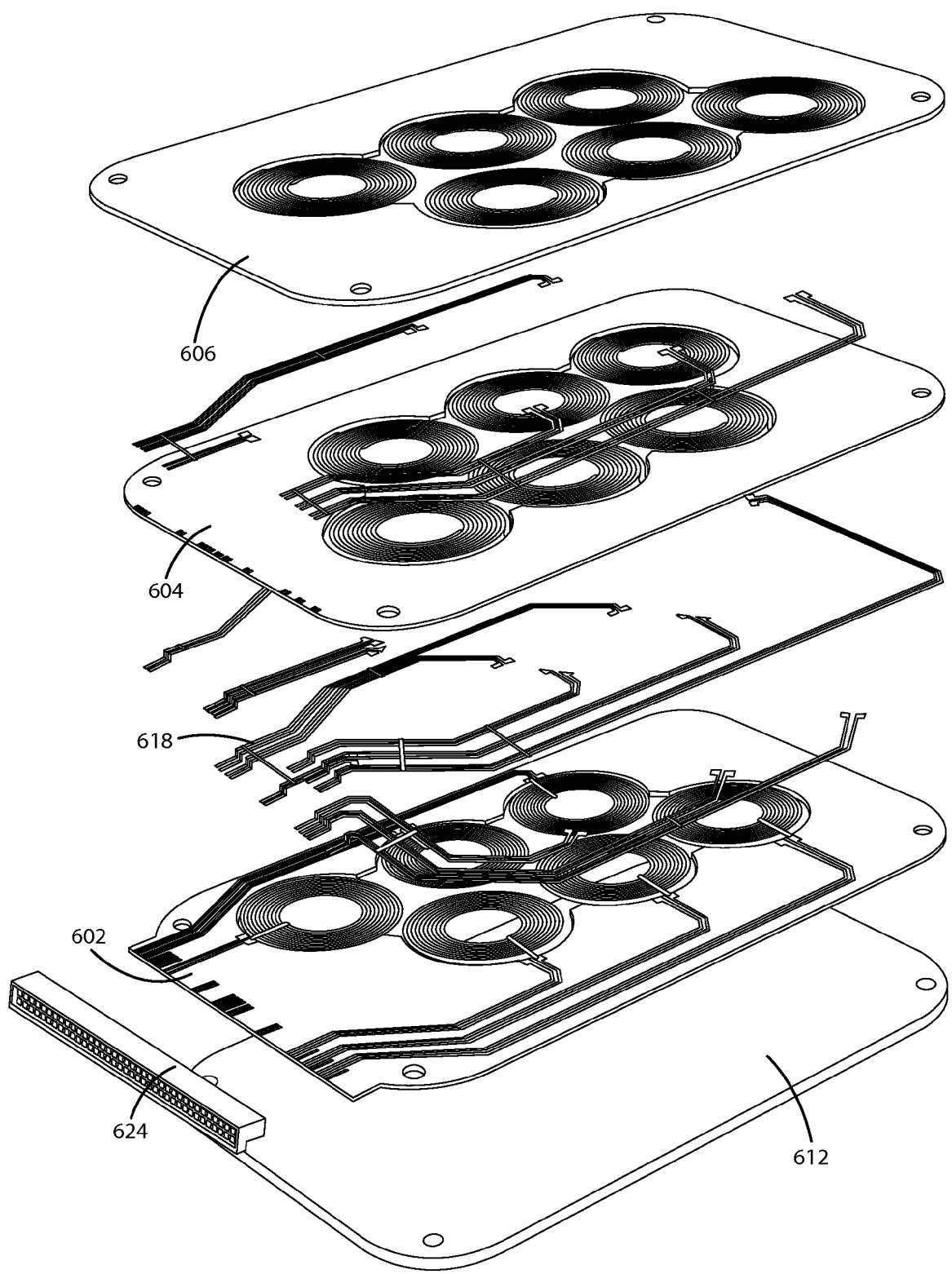
FIG. 18 shows an exploded view of the multi-layer shim assembly of FIG. 17.
Figure 19:
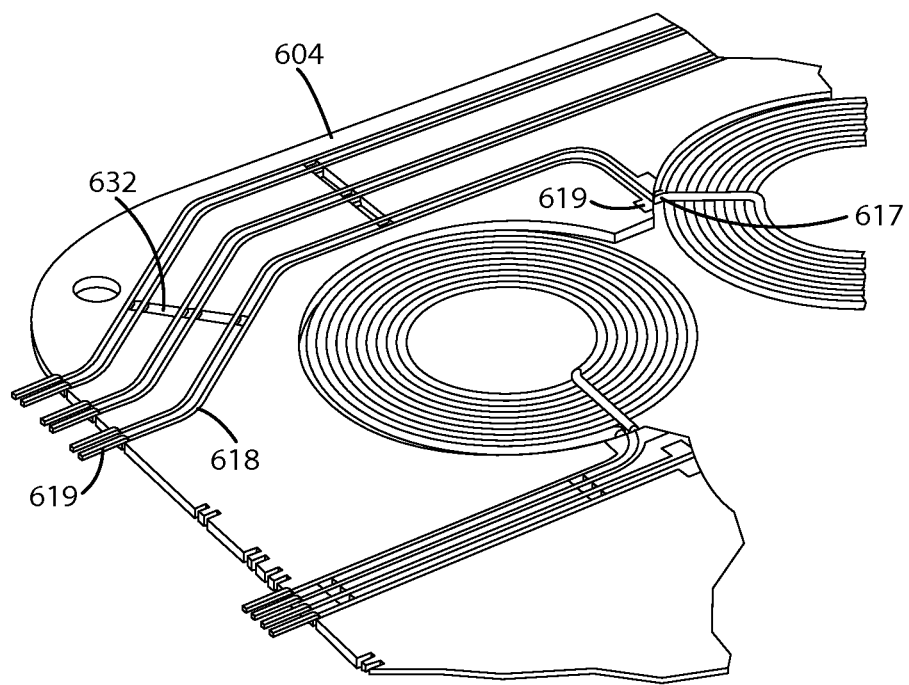
FIG. 19 shows a detailed view of a portion of the multi-layer shim assembly of FIG. 17 after portions of the traces have been punched out.
Figure 20:
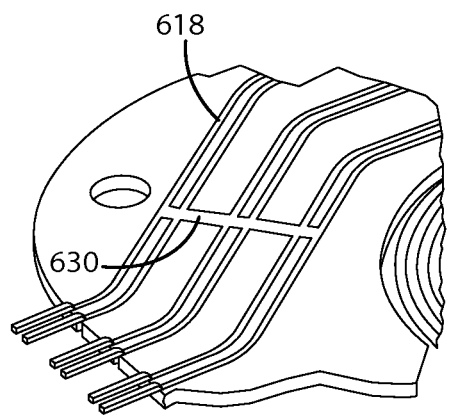
FIG. 20 shows a detailed view of a portion of the multi-layer shim assembly of FIG. 17 before portions of the traces have been punched out.

Prior to the plastic over-molding, the stamped traces 618 are punched out together and connected by tabs 630. This can ease the handling and placement of the stamped traces 618 prior to over-molding. During or after the molding process, the connector tabs 630 are punched-out to leave individual traces 618 embedded in the plastic shim. Apertures 632 may be left in the shims once the tabs 630 are punched out. If the traces have termination points, the termination points 619 on the stamped metal traces 618 may be crimp connections, a pin connector, solder pads, or essentially any other type of terminator. As shown in FIG. 18, a pin connector 624 may provide an interface for electrically connecting wireless power circuitry to the multi-layer shim assembly 600.

Figure 21:
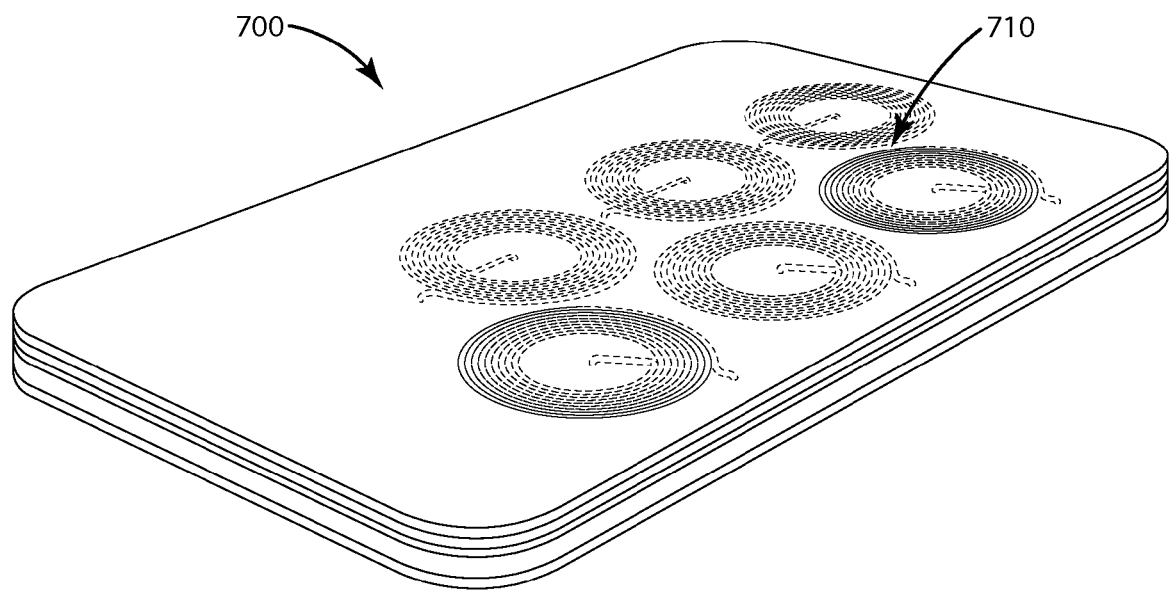
FIG. 21 shows a perspective top view of an assembled multi-layer shim assembly with over-molded coil array shims.
Figure 22:
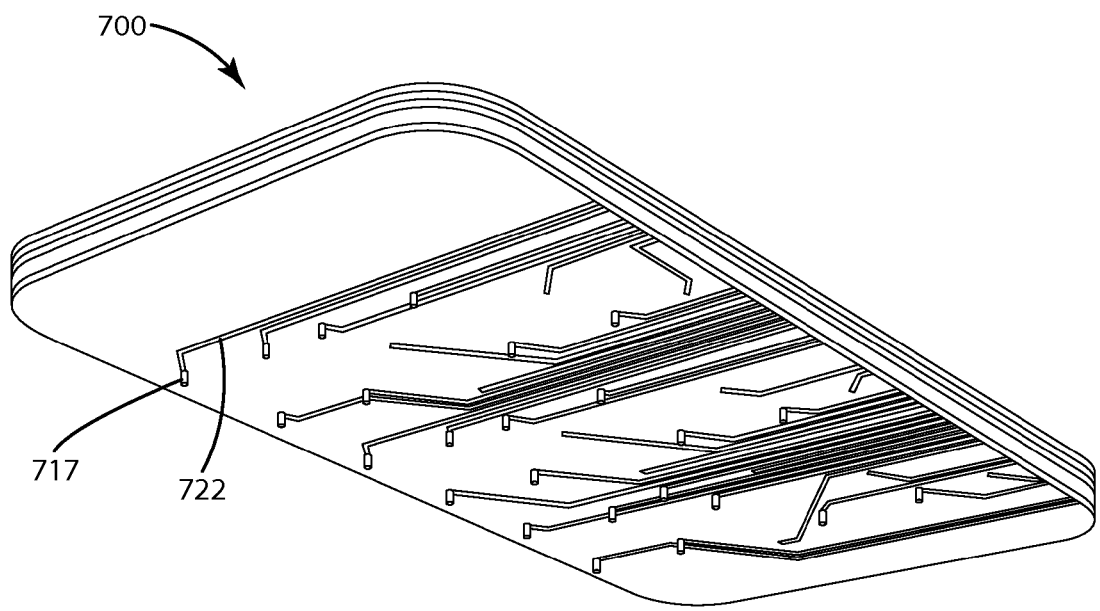
FIG. 22 shows a perspective bottom view of the multi-layer shim assembly of FIG. 21.
Figure 23:
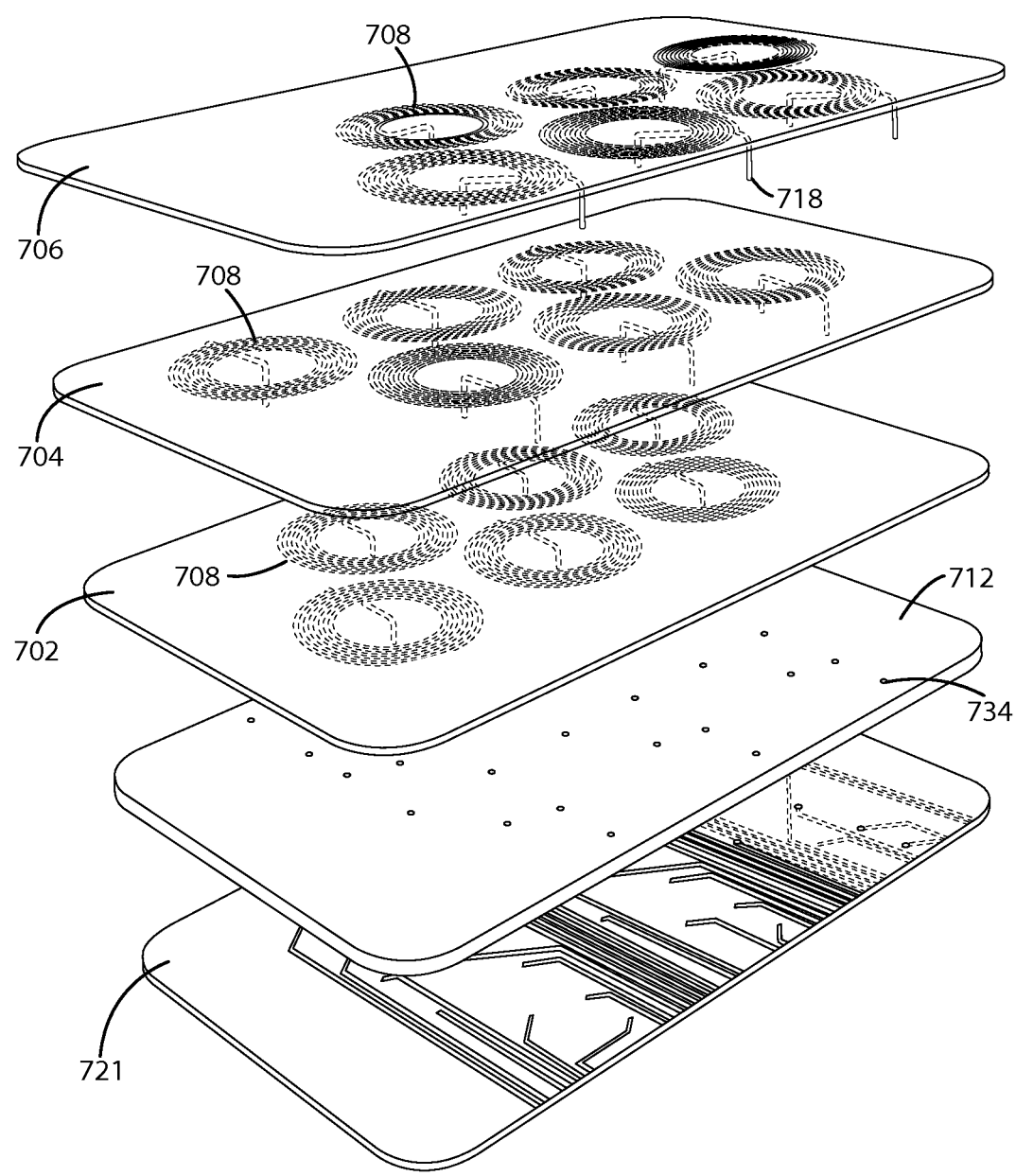
FIG. 23 shows an exploded view of the multi-layer shim assembly of FIG. 21.

Referring to FIGS. 21-23, an embodiment of a multi-layer shim assembly 700 is depicted where each shim is over-molded. In the depicted embodiment, the multi-layer shim assembly 700 includes three over-molded shims 702, 704, 706, eighteen coils 708 forming a multi-layer coil array 710, a shield 712, and a printed circuit board 721. The multi-layer overmolded shim assembly 700 can include an alignment system for aligning a first subset of wireless power coils and a second subset of wireless power coils in a multi-layer wireless power coil array. The alignment system can including alignment features in each of the overmolded shim layers and in the shield layer. An alignment feature can include a bump, post, peg, extrusion, edge, cavity, hole or essentially any other type of alignment feature. The multi-layer overmolded shim assembly 700 can also include a routing system for routing electrical connections from the first and second subsets of wireless power coil. The routing system can include routing features in the first overmolded shim layer, the second over-molded shim layer, and a shield layer, if one is present. A routing feature can include a channel, a stamped trace, an edge, a hole, or essentially any other type of routing feature.

In the current embodiment, each over-molded shim is over-molded with six coils 708 forming a plastic casing around the coils with the coil wires protruding out of the shim. The over-molded shims 702, 704, 706 can completely or partially surround the coils 708. In one embodiment, the coil wires protrude out of the edge of the shim. In another embodiment, the coil wires protrude out of the bottom surface of the shim from the outer diameter and inner diameter of each coil. In embodiments where the coil wires protrude out of the bottom surface of the shim, the shims 704, 706, shield 712, and printed circuit board 721 can all include apertures 734 so that the coil wires 718 can be routed through the multi-layer shim assembly 700 to reach the printed circuit board 721 where the coil leads 717 of the coil wires 718 can be soldered or otherwise connected to the conductive traces 722 on the printed circuit board 721. The conductive traces 722 on the printed circuit board can route electrical connections to wireless power circuitry or to a terminal area such as an edge board connector, solder pads, screw terminals, or other appropriate termination.

In a variation on the wire wound coils, the wire leads may be soldered, welded, or otherwise attached to metallic tabs prior to over-molding with plastic. Then the metallic tabs would protrude from the disk after the over-molding process In some embodiments, the coils 708 can be constructed of stamped sheet metal instead of wires. In stamped coil embodiments, the coils can have metallic tabs that protrude from the outer diameter and inner diameter of the coils instead of coil wires. The protruding metallic tabs can be bent perpendicular to the plane of the shim so that each shims can be stacked on top of one another as described with the coil wires above. One advantage of this configuration is that the coil lead on the inside diameter of the coil does not cross-over the coil, which would add Z-dimension thickness.

Figure 24:
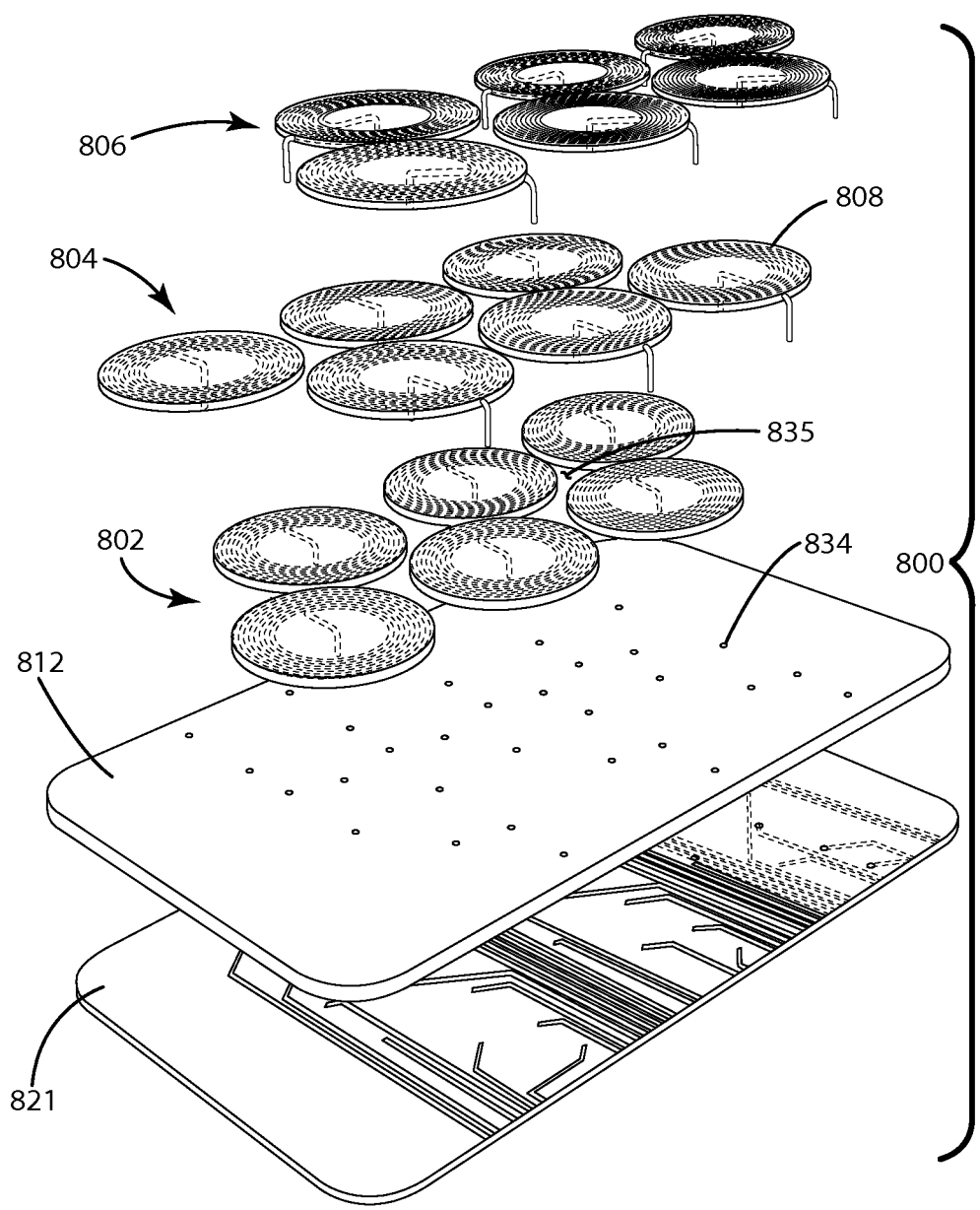
FIG. 24 shows an exploded view of a multi-layer shim assembly with individually over-molded coils.

Referring to FIG. 24, a variation on the FIGS. 21-23 embodiment is depicted. In the depicted embodiment, the multi-layer shim assembly 800 includes three over-molded shims 802, 804, 806, eighteen coils 808 forming a multi-layer coil array 810, a shield 812, and a printed circuit board 821. The primary difference between this embodiment and the FIGS. 21-23 embodiment is that each of the coils in each shim can be individually over-molded instead of over-molding an entire shim at once. Just as in the FIGS. 21-23 embodiment, the multi-layer overmolded shim assembly 800 can include an alignment system and a routing system.

In the current embodiment, each coil is individually over-molded into a plastic disk. The wire leads from each coil protrude from the plastic disk in much the same way as described above. Although the individually over-molded coils are described as wire coils, in alternative embodiments stamped coils could be individually over-molded. The apertures 834 in the shield 812, the printed circuit board 821, and the shims 802, 804, 806 allow the wire leads from each coil to be routed through the multi-layer shim assembly. In some embodiments, the air gaps 835 between the individually over-molded coils 808 in each shim 802, 804, 806 are sufficient to route the wire leads from each coil, and no apertures in the shims are necessary.

In some embodiments, a protrusion in the overmold helps to assist in alignment. For example, a bump, post, peg, extrusions or other type of protrusion can assist in alignment. In the current embodiment, the coil leads are overmolded so that they are rigid and are thereby are capable of providing both an electrical connection between the individual overmolded coil and the printed circuit board 821 (via the underlying coil lead) and simultaneously also act as guides for coil alignment. For example, in the current embodiment, the spacing and arrangement of the coils is determined by the location of the coil leads and the location of the holes in the shield 812. In alternative embodiments, two separate structures can be used to provide the electrical connection and the alignment. For example, a non-rigid coil lead can be routed through a whole in the shield 812 to the printed circuit board 821 and a separate protrusion on each individual overmolded disk can be used to align the coils in the desired arrangement. In another embodiment, the separate protrusions may be included on the shield in order to align the individual overmolded coils.

Figure 25:
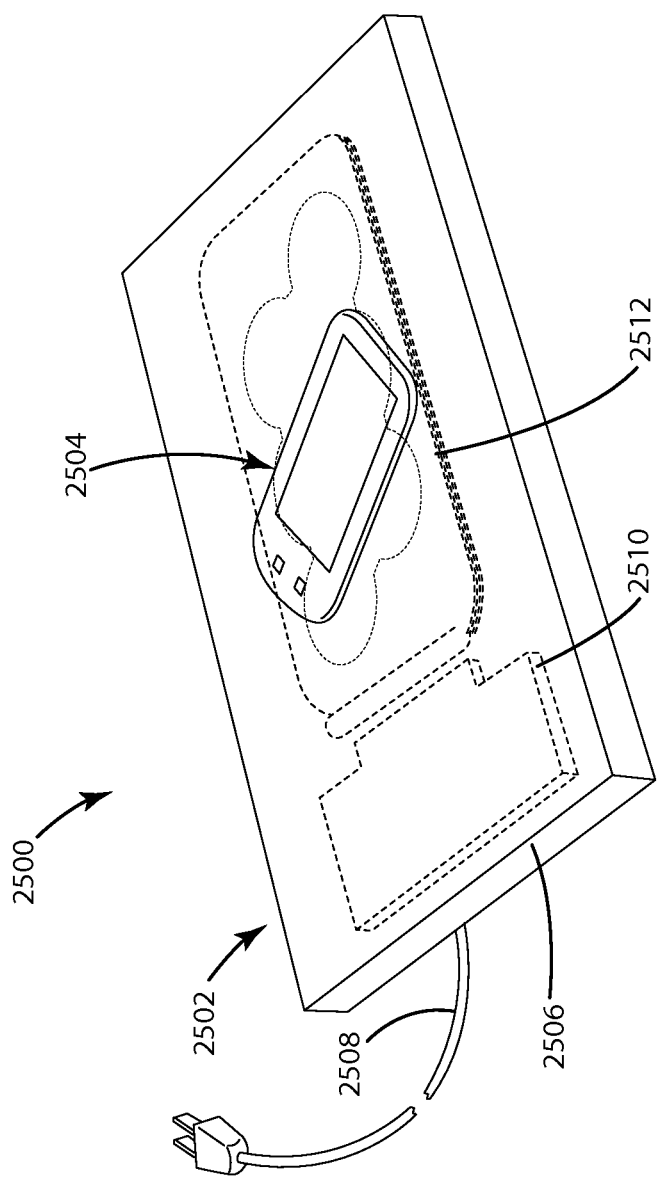
FIG. 25 shows a perspective view of a wireless power supply system in accordance with an embodiment of the present invention.

A wireless power supply system constructed in accordance with one embodiment of the present invention is shown in FIG. 25, and generally designated 2500. In general, the wireless power supply system 2500 includes a wireless power supply 2502 and a remote device 2504. Wireless power supply system can refer to the wireless power supply, one or more remote device, or the combination of the wireless power supply and the one or more remote devices. The wireless power supply 2502 is capable of generating an electromagnetic field and the remote device is capable of wirelessly receiving and utilizing the energy in the electromagnetic field.

The wireless power supply 2502 includes a housing 2506, a cord 2508, wireless power supply circuitry 2510, and a multi-layer shim assembly 2512. The housing 2506 protects the components of the wireless power supply 2502 and provides a wireless transfer surface where remote devices can be placed to receiver power. In general, the wireless transfer surface and the surrounding area of the housing are non-conductive and non-magnetic. Other portions of the housing may be conductive and magnetic if desired.

The cord 2508 is provided to connect the wireless power supply to a power source, such as an AC or a DC power source. In alternative embodiments, for example in a battery powered construction, a cord may be unnecessary.

The wireless power supply circuitry 2510 may include essentially any circuitry capable of supplying an AC signal to one or more coils in the multi-layer coil array of the multi-layer shim assembly 2512. In the current embodiment, the wireless power circuitry 2510 is located within the housing 2506. In some embodiments, the wireless power circuitry 2510 may be integrated with the multi-layer shim assembly 2512. It may be desirable to use inductive power supply circuitry including the resonant seeking circuit of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

A variety of different embodiments of the multi-layer shim assembly are discussed above. Essentially any multi-layer shim assembly 2512 that aids in alignment of the coils into a multi-layer coil array and aids in routing conductors from the wireless power supply circuitry 2510 to the multi-layer coil array can be utilized.

The wireless power supply 2502 is intended for use with a wide variety of remote devices 2504 of varying designs and constructions. In general, each remote device includes one or more secondary coils, wireless power reception circuitry, and a load. For DC loads, the wireless power reception circuitry may include a rectification circuitry to convert the AC power to DC power. In some embodiments, the wireless power reception circuitry may include regulation circuitry for providing a regulated output to the load. The load may be a battery or some other component capable of utilizing the power provided by the wireless power reception circuitry.

To the extent they are used, directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to packages of any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A multi-layer shim assembly for use in positioning an upper plurality of wireless power coils and a lower plurality of wireless power coils in a multi-layer coil array, said multi-layer shim assembly comprising:

a first shim layer including a first guide portion for aligning said upper plurality of wireless power coils in said multi-layer coil array and a first routing portion for routing electrical connections from each of said upper plurality of wireless power coils, wherein said first shim layer includes a major surface, and wherein said first guide portion includes a first wall portion extending from said major surface to define a first recess to simultaneously encompass said upper plurality of wireless power coils therein, said first wall portion encompassing said upper plurality including at least two wireless power coils; and a second shim layer joined with said first shim layer, said second shim layer including a second guide portion for aligning said lower plurality of wireless power coils in said multi-layer coil array and a second routing portion for routing electrical connections from each of said lower plurality of wireless power coils, wherein said second shim layer includes a major surface, and wherein said second guide portion includes a second wall portion extending from said major surface to define a second recess to simultaneously encompass said lower plurality of wireless power coils therein, said second wall portion encompassing said lower plurality including at least two wireless power coils, wherein said first guide portion and said second guide portion cooperate to align said plurality of wireless power coils in a predefined, overlapping, coil array, wherein said first recess is offset with respect to said second recess such that said upper plurality of wireless power coils is substantially axially offset with respect to said lower plurality of wireless power coils when received within said first and second recesses, respectively.

2. The multi-layer shim assembly of claim 1 wherein said first shim layer is constructed from a non-conductive material.

3. The multi-layer shim assembly of claim 1 wherein said first shim layer is at least partially constructed from a flux concentrating material, wherein said flux concentrating material increases inductance of said upper plurality of wireless power coils and enhances a flux path within said multi-layer shim assembly.

4. The multi-layer shim assembly of claim 1 wherein said first shim layer is at least partially constructed from a shielding material, wherein said first guide portion includes at least one of a bump, post, peg, and extrusion constructed from a flux concentrating material.

5. The multi-layer shim assembly of claim 1 wherein said first shim layer is a printed circuit board.

6. The multi-layer shim assembly of claim 1 wherein said first routing portion and said second routing portion include a channel system for routing wires between said upper and lower plurality of wireless power coils and an edge of said first and second shim layers, respectively.

7. The multi-layer shim assembly of claim 1 wherein at least one of said first routing portion and said second routing portion includes a stamped trace for routing power between an edge of said multi-layer shim assembly and a plurality of connection points for said upper and lower plurality of wireless power coils.

8. The multi-layer shim assembly of claim 7 wherein said stamped trace is over molded into at least one of said first shim layer and said second shim layer.

9. The multi-layer shim assembly of claim 1 wherein leads from each of said upper plurality of wireless power coils are routed along a surface of said first shim layer for connection to wireless power circuitry.

10. The multi-layer shim assembly of claim 9 wherein said leads from each of said upper plurality of wireless power coils are routed around a shield for connection to a printed circuit board.

11. The multi-layer shim assembly of claim 9 wherein leads from each of said upper and lower plurality of wireless power coils are routed to a connector, said connector capable of electrically connecting said upper and lower plurality of wireless power coils to wireless power circuitry.

12. A multi-layer shim assembly for use in positioning a first and second plurality of wireless power coils in a multi-layer coil array, said multi-layer shim assembly comprising:
a first shim layer including a major surface, a first guide portion for aligning said first plurality of wireless power coils in said multi-layer coil array, and a first routing portion for routing electrical connections from each of said first plurality of wireless power coils, wherein said first guide portion and said first routing portion each include a wall portion extending from said upper surface to define a recess in said first shim layer to simultaneously encompass said first plurality of wireless power coils and said electrical connections, respectively; and
a printed circuit board forming a second shim layer including said second plurality of wireless power coils in said multi-layer coil array printed on said printed circuit board and a second routing portion including a printed circuit board trace network,
wherein said first guide portion aligns said first plurality of wireless power coils in a predefined, overlapping, array with respect to said second plurality of wireless power coils such that said first plurality of wireless power coils is substantially axially offset with respect to said second plurality of wireless power coils.

13. The multi-layer shim assembly of claim 12 wherein at least a portion of said first shim layer is constructed from a flux concentrating material.

14. The multi-layer shim assembly of claim 12 wherein said first routing portion includes a channel system for routing wires between said first plurality of wireless power coils and said printed circuit board.

15. The multi-layer shim assembly of claim 12 wherein said first routing portion includes a stamped trace for routing power between said first plurality of wireless power coils and said printed circuit board.

16. The multi-layer shim assembly of claim 15 wherein said stamped trace is over molded into said first shim layer.

17. The multi-layer shim assembly of claim 9 wherein said printed circuit board trace network provides an electrical connection between said second plurality of wireless power coils and a plurality of connection points for wireless power circuitry and said printed circuit board trace network provides an electrical connection between said first routing portion and said plurality of connection points for wireless power circuitry.

18. A multi-layer shim assembly comprising:
an upper shim layer including a first recess that is shaped to simultaneously receive each of a first plurality of wireless power coils therein, the upper shim layer including a first plurality of traces to extend from each of the first plurality wireless power coils;
a middle shim layer including a second recess that is shaped to simultaneously receive each of a second plurality of wireless power coils therein, the middle shim layer including a second plurality of traces to extend from each of the second plurality of wireless power coils,
a lower shim layer including a third recess that is shaped to simultaneously receive each of a third plurality of wireless power coils therein, the lower shim layer including a third plurality of traces to extend from each of the third plurality of wireless power coils,
wherein the first, second and third recesses are axially offset with respect to each other to align the first, second and third plurality of wireless power coils in a predefined partially overlapping three-dimensional coil array when the first, second and third plurality of wireless power coils are received within their respective recesses.

19. The multi-layer shim assembly of claim 18 wherein one of the upper shim layer, the middle shim layer, and the lower shim layer includes a lateral extension that protrudes beyond the others of the upper shim layer, the middle shim layer, and the lower shim layer.

20. The multi-layer shim assembly of claim 18 wherein a portion of the outer periphery of the upper shim layer, the middle shim layer, and the lower shim layer are in substantial vertical alignment with respect to each other.

21. The multi-layer shim assembly of claim 18 further including a shield adjacent at least one of the upper shim layer, the middle shim layer, and the lower shim layer.

* * * * *